(12) United States Patent
Hsieh et al.

(10) Patent No.: US 8,362,988 B2
(45) Date of Patent: Jan. 29, 2013

(54) LIQUID CRYSTAL DISPLAY DEVICE AND DRIVING METHOD THEREOF

(75) Inventors: Chih-Yung Hsieh, Tainan (TW); Ming-Feng Hsieh, Tainan (TW); Che-Ming Hsu, Tainan (TW)

(73) Assignee: Chimei Innolux Corporation, Miao-Li County (TW)

( * ) Notice: Subject to any disclaimer, the term of this patent is extended or adjusted under 35 U.S.C. 154(b) by 1454 days.

(21) Appl. No.: 11/951,080

(22) Filed: Dec. 5, 2007

(65) Prior Publication Data

US 2008/0136985 A1  Jun. 12, 2008

(30) Foreign Application Priority Data

Dec. 7, 2006  (TW) ............................. 95145794 A

(51) Int. Cl.
*G09G 3/38* (2006.01)
(52) U.S. Cl. ............... 345/87; 345/89; 345/695; 348/38
(58) Field of Classification Search .................... 345/87, 345/90, 204, 694, 695, 89, 92–94, 99, 208; 349/38, 39, 139
See application file for complete search history.

(56) References Cited

U.S. PATENT DOCUMENTS

| 6,768,482 | B2 * | 7/2004 | Asano et al. ..................... 345/90 |
| 6,965,366 | B2 * | 11/2005 | Ozawa ............................. 345/89 |
| 6,972,527 | B2 | 12/2005 | Su et al. |
| 7,084,846 | B2 * | 8/2006 | Adachi et al. ................... 345/89 |
| 7,633,481 | B2 * | 12/2009 | Kim et al. ....................... 345/99 |
| 7,796,104 | B2 * | 9/2010 | Kim ................................. 345/87 |
| 7,859,500 | B2 * | 12/2010 | Sasabayashi et al. ........... 345/90 |
| 2005/0122441 | A1 * | 6/2005 | Shimoshikiryoh ............. 349/38 |
| 2005/0236981 | A1 * | 10/2005 | Cok et al. ....................... 313/504 |
| 2006/0158576 | A1 * | 7/2006 | Kim et al. ....................... 349/38 |
| 2007/0085779 | A1 * | 4/2007 | Smith et al. .................... 345/76 |
| 2007/0242014 | A1 * | 10/2007 | Lee et al. ........................ 345/88 |

FOREIGN PATENT DOCUMENTS

TW  200509171  8/2003

* cited by examiner

*Primary Examiner* — Joe H Cheng
(74) *Attorney, Agent, or Firm* — Lowe Hauptman Ham & Berner LLP

(57) ABSTRACT

An LCD device includes a plurality of pixels arranged in a matrix. Each pixel includes a first sub-pixel and a second sub-pixel. Each of the first and second sub-pixels includes a liquid crystal capacitor and a storage capacitor. A capacitance ratio of the liquid crystal capacitor to the storage capacitor in the first sub-pixel is smaller than that in the second sub-pixel. In a first pixel and a second pixel among all the pixels, the first sub-pixel of the first pixel and the first sub-pixel of the second pixel are staggered, and the second sub-pixel of the first pixel and the second sub-pixel of the second pixel are staggered.

27 Claims, 23 Drawing Sheets

US 8,362,988 B2

LIQUID CRYSTAL DISPLAY DEVICE AND DRIVING METHOD THEREOF

RELATED APPLICATIONS

The present application is based on, and claims priority from, Taiwan Application Number 95145794, filed Dec. 7, 2006, the disclosure of which is hereby incorporated by reference herein in its entirety.

BACKGROUND OF THE INVENTION

1. Field of Invention

The invention relates to a liquid crystal display (LCD) device and, in particular, to a pixel arrangement and a driving method of an LCD device.

2. Related Art

An LCD device is one type of usually flat panel displays and has the advantages of high resolution, light weight, a thin thickness, and low power consumption. Thus, LCD devices, which are more and more widely, used serve as computer display devices and touch screens for man-machine interfaces, and are also combined with video systems to form televisions.

However, the LCD device still has some technological problems to be solved, such as the problem of wide angle viewing. The viewing angle of the LCD device relates to the γ property thereof. The γ property represents the relationship between the gray-scale value and the luminance of the image. FIG. 1 shows characteristic curves of gray-scale values versus light transmittances in a multi-domain vertical alignment mode LCD panel according to the prior art. As depicted in FIG. 1, curves L1 to L3 represent the light transmittances observed from a front side of the multi-domain vertical alignment mode LCD panel. The curve L1 represents the red light transmittance, the curve L2 represents the green light transmittance, and the curve L3 represents the blue light transmittance. However, when viewing the multi-domain vertical alignment mode LCD panel at the tilt angle of 60 degrees, the observed light transmittance changes according to the same operation voltage so that the curves L1, L2, L3 respectively drift to the curves L4, L5, L6.

As depicted in FIG. 1 again, the light transmittance of the curve L1 approaches the light transmittance of the curve L4, the light transmittance of the curve L2 approaches the light transmittance of the curve L5, and the light transmittance of the curve L3 approaches the light transmittance of the curve L6 in the areas with the higher gray-scale value and the lower gray-scale value. However, the light transmittances of the curves L1, L2 and L3 are separated from those of the corresponding curves L4, L5 and L6 in the middle gray-scale area. That is, the color shift phenomena in the higher gray-scale area and the lower gray-scale area is slight, and the color shift phenomenon in the middle gray-scale area is more pronounced.

FIG. 2 is a graph depicting the relationship between normalized luminances of the images viewed in front of and in neighboring the front of the screen using the same gray-scale value in the conventional LCD device, wherein the dashed line represents the ideal values, and the solid line represents the actual values. More specifically, the γ properties of the images viewed in front of, and neighboring the front of the screen under the ideal condition are the same. Therefore, the relationship between the normalized luminances appears as a straight line with the slope of 1, as depicted by the dashed line of FIG. 1. In practice, however, the LCD device has the problem that the viewing angle is not wide enough. Thus, when the user is watching the image in front of and neighboring the front of the screen, they properties of the viewed images are different. That is, the normalized luminances of the images viewed by the user in front of and neighboring the front of the screen are different. Usually, the normalized luminance of the image viewed in front of the screen is higher than the normalized luminance of the image viewed from a position neighboring the front of the screen. Thus, the luminance difference between the frames viewed at different angles on the multi-domain liquid crystal screen causes the different results of the color mixing, and the apparent colors still have some difference so that the color shift phenomenon is produced.

To solve the above-mentioned problems, the prior art changes the circuit layout and addresses the color shift phenomenon based upon the data of FIG. 1 that suggests the color light with the higher gray-scale value and the lower gray-scale value may have the slighter color shift phenomenon. In this prior art, a pixel unit is divided into two areas with different light transmittances. One of the areas has the light transmittance and displays the higher gray-scale color, and the other area has lower light transmittance and displays the lower gray-scale color. More particularly, the user may see a similar color when watching the improved multi-domain vertical alignment mode LCD panel with a middle gray-scale color, which is formed by mixing the higher gray-scale color with the lower gray-scale color, whether viewed straightened or slanted.

Referring to FIG. 3, a conventional multi-domain LCD device 1 includes a liquid crystal panel 100, a source driver 102 and a gate driver 104. The liquid crystal panel 100 includes n×m pixels 10. The source driver 102 transfers display data to the pixels 10 through data lines D(1) to D(n), respectively. The gate driver 104 transfers scan signals to the liquid crystal panel 100 through scan lines S(1) to S(m) to sequentially turn on each column of pixels 10, and transfers a first bias signal and a second bias signal to each pixel 10 on the liquid crystal panel 100 through first storage capacitor lines B1(1) to B1(m) and second storage capacitor lines B2(1) to B2(m), respectively. As depicted in FIGS. 4 and 5, a pixel divided structure of the LCD device 1 proposed in the prior art has a plurality of pixels 10 arranged in a matrix. Each pixel 10 includes a first sub-pixel 11 and a second sub-pixel 12. Each first sub-pixel 11 includes a liquid crystal capacitor $C_{LC1}$, a storage capacitor $C_{ST1}$ and a switch element $M_1$, and each second sub-pixel 12 includes a liquid crystal capacitor $C_{LC2}$, a storage capacitor $C_{ST2}$ and a switch element $M_2$. In addition, the LCD device 1 further includes a plurality of scan lines S(1) to S(m), a plurality of data lines D(1) to D(n) and a plurality of storage capacitor lines 15. The storage capacitor lines 15 include the first storage capacitor lines B1(1) to B1(m) and the second storage capacitor lines B2(1) to B2(m). The scan lines S(1) to S(m) and the storage capacitor lines 15 are disposed in parallel and alternately, and the data lines D(1) to D(n) are perpendicular to the scan lines S(1) to S(m). As depicted in FIG. 4 and taking one of the pixels 10 as an example, the $i^{th}$ scan line S(i) is disposed between the first sub-pixel 11 and the second sub-pixel 12 and connected to the gates of the switch element $M_1$ and the switch element $M_2$, and the $j^{th}$ data line DO) is connected to the liquid crystal capacitor $C_{LC1}$ and the storage capacitor $C_{ST1}$ through the switch element $M_1$, and connected to the liquid crystal capacitor $C_{LC2}$ and the storage capacitor $C_{ST2}$ through the switch element $M_2$. In addition, the storage capacitor $C_{ST1}$ and the storage capacitor $C_{ST2}$ are respectively connected to the $i^{th}$ first storage capacitor line B1($i$) and the $i^{th}$ second storage capacitor line B2($i$), wherein the $i^{th}$ second storage capacitor line B2($i$) and the $(i+1)^{th}$ first storage capacitor line B1($i$+1) share the same physical circuit layout.

FIG. 5 is a schematic illustration depicting the circuit layout of several pixels 10, wherein the area A represents the display area of the first sub-pixel 11, the area B represents the display area of the second sub-pixel 12, and the areas A and B are alternately disposed along the scan line direction alternately. Herein, a dot inversion polarity switching method is provided as an example, in which the pixel voltages of the same pixel in neighboring frame times have different polarities, and the pixel voltages of the neighboring pixels also have different polarities. When one of the pixels 10 is enabled, its operation timing is depicted in FIG. 6. Taking the area A as an example, the $i^{th}$ first storage capacitor line B1($i$) turns to the low voltage level after the $i^{th}$ scan line S($i$) outputs the scan signal in a first frame time f1. Thus, the pixel voltage (i.e., the capacitance of the liquid crystal capacitor $C_{LC1}$) in the area A is influenced by the storage capacitor $C_{ST1}$ and is slightly decreased from the original "X" to "X−ΔV". In a second frame time f2, the $i^{th}$ first storage capacitor line B1($i$) again turns back to the high voltage level after the $i^{th}$ scan line S($i$) outputs the next scan signal. At this time, the pixel voltage (i.e., the capacitance of the liquid crystal capacitor $C_{LC1}$) in the area A is influenced by the storage capacitor $C_{ST1}$, and is slightly increased from the original "−X" to "−X+ΔV". In addition, taking the area B as an example, the $i^{th}$ second storage capacitor line B2($i$) turns to the high voltage level after the $i^{th}$ scan line S($i$) has outputted the scan signal and one half clock is elapsed in the first frame time f1. Thus, the pixel voltage (i.e., the capacitance of the liquid crystal capacitor $C_{LC2}$) in the area B is influenced by the storage capacitor $C_{ST2}$ and is slightly increased from the original "X" to "X+ΔV". In the second frame time f2, the $i^{th}$ second storage capacitor line B2($i$) turns back to the low voltage level after the $i^{th}$ scan line S($i$) has outputted the next pulse signal and one half clock has elapsed. At this time, the pixel voltage (i.e., the capacitance of the liquid crystal capacitor $C_{LC2}$) in the area B is influenced by the storage capacitor $C_{ST2}$, and is slightly decreased from the original "−X" to "−X−ΔV".

As mentioned above, the same pixel is further divided into two sub-pixels in the prior art, and the γ property of the LCD device 1 is improved by controlling the pixel voltages of the two sub-pixels, as depicted in FIG. 7. As depicted in FIG. 5, however, this method makes the pixel voltage difference of the first sub-pixel 11 become "X−ΔV" (in the first frame time f1) or "−X+ΔV" (in the second frame time f2) to generate a lower gray-scale color, for example, and makes the pixel voltage difference of the second sub-pixel 12 become "X+ΔV" (in the first frame time f1) or "−X−ΔV" (in the second frame time f2) to generate a higher gray-scale color, for example. As mentioned hereinabove, when the higher gray-scale color and the lower gray-scale color are mixed to form a middle gray-scale color, the color shift phenomenon can be improved.

FIG. 8 is a graph depicting the relationship between the transmittance and an input voltage in a conventional LCD device. When an input voltage X is in the low transmittance representation, the fixed ΔV makes the luminance of the bright zone be different from that of the dark zone. However, this phenomenon can be corrected by modifying the value of the input voltage. When the input voltage X is in the high transmittance representation, the fixed ΔV decreases the luminance. As depicted in FIG. 8, the fixed ΔV makes the decreasing rate of the transmittance T(X−ΔV) greater than the increasing rate of the transmittance T(X+ΔV) (i.e., the difference between T(X−ΔV) and T(X) is greater than the difference between T(X+ΔV) and T(X)). In addition, because the highest voltage value is usually fixed, it cannot be changed by adjusting the input signal, so the overall luminance of the display may deteriorate.

Thus, it is an important subject in the display industry to provide an LCD device and driving method capable of improving the image displaying γ property of and further enhancing color difference compensation.

SUMMARY OF THE INVENTION

In view of the foregoing, embodiments of the invention disclosed herein provide an LCD device and a driving method thereof, which can improve the γ property of image displaying and further enhance color difference compensation.

To achieve the above, the invention discloses a liquid crystal display (LCD) device including a plurality of pixels arranged in a matrix. Each of the pixels includes a first sub-pixel and a second sub-pixel, and each of the first sub-pixels and the second sub-pixels includes a liquid crystal capacitor and a storage capacitor. A capacitance ratio of the storage capacitor to the liquid crystal capacitor in each of the first sub-pixels is smaller than that in each of the second sub-pixels. Regarding a first pixel and a second pixel, the first sub-pixel of the first pixel and the first sub-pixel of the second pixel are staggered, and the second sub-pixel of the first pixel and the second sub-pixel of the second pixel are staggered.

In addition, embodiments of the invention disclose a liquid crystal panel including a data line, a scan line, a pixel, a first storage capacitor line and a second storage capacitor line. The data line is formed along a first direction for providing an input voltage, and the scan line is formed along a second direction perpendicular to the first direction. The pixel is formed at an intersection of the data line and the scan line, and includes a first sub-pixel and a second sub-pixel. The first sub-pixel includes a first switch, a first liquid crystal capacitor and a first storage capacitor, and the second sub-pixel includes a second switch, a second liquid crystal capacitor and a second storage capacitor. The first switch has a first terminal connected to the scan line, a second terminal connected to the data line, and a third terminal connected to a first terminal of the first liquid crystal capacitor and a first terminal of the first storage capacitor. The second switch has a first terminal connected to the scan line, a second terminal connected to the data line, and a third terminal connected to a first terminal of the second liquid crystal capacitor and a first terminal of the second storage capacitor. The first storage capacitor line is electrically connected to a second terminal of the first storage capacitor. The second storage capacitor line is electrically connected to a second terminal of the second storage capacitor.

When the scan line is enabled, the first switch and the second switch turn on such that a signal on the data line is transmitted to the first sub-pixel and the second sub-pixel. After the scan line is then disabled, levels on the first storage capacitor line and the second storage capacitor line are respectively changed such that a first offset voltage is generated between a pixel voltage of the first sub-pixel before and after the level change of the first storage capacitor line, and a second offset voltage is generated between a pixel voltage of the second sub-pixel before and after the level change of the second storage capacitor line. The pixel voltage of the first sub-pixel is different from the pixel voltage of the second sub-pixel, and the first offset voltage is different from the second offset voltage.

To achieve the above arrangement, the invention includes a driving method applied to a liquid crystal panel. The liquid crystal panel includes a data line, a scan line, a pixel, a first storage capacitor line and a second storage capacitor line. The data line is formed along a first direction, and the scan line is formed along a second direction perpendicular to the first direction. The pixel is formed at an intersection of the data line and the scan line, and includes a first sub-pixel and a second sub-pixel. The first sub-pixel includes a first switch, a first liquid crystal capacitor and a first storage capacitor, and the second sub-pixel includes a second switch, a second liquid crystal capacitor and a second storage capacitor. The first switch has a first terminal connected to the scan line, a second terminal connected to the data line and a third terminal connected to a first terminal of the first liquid crystal capacitor and a first terminal of the first storage capacitor. The second switch has a first terminal connected to the scan line, a second terminal connected to the data line, and a third terminal connected to a first terminal of the second liquid crystal capacitor and a first terminal of the second storage capacitor. The first storage capacitor line is electrically connected to a second terminal of the first storage capacitor, and the second storage capacitor line is electrically connected to a second terminal of the second storage capacitor.

The driving method includes the following steps of: enabling the scan line to turn on the first switch and the second switch, transmitting a signal from the data line to the first sub-pixel and the second sub-pixel, and disabling the scan line. After the scan line is disabled, levels on the first storage capacitor line and the second storage capacitor line are respectively changed so that a first offset voltage is generated between a pixel voltage of the first sub-pixel and an input voltage, and a second offset voltage is generated between a pixel voltage of the second sub-pixel and the input voltage. The pixel voltage of the first sub-pixel is different from the pixel voltage of the second sub-pixel, and the first offset voltage is different from the second offset voltage.

As mentioned above, each pixel includes a first sub-pixel and a second sub-pixel in the LCD device of the invention, and the capacitance ratio of the liquid crystal capacitor to the storage capacitor in the first sub-pixel is smaller than that of the liquid crystal capacitor to the storage capacitor in the second sub-pixel. Therefore, the LCD device and the driving method thereof according to the invention can make the γ value of the LCD device approach the ideal value, effectively improve the γ property of image displaying, and thus enhance the color difference compensating ability. Thus, mitigating the effects of the phenomenon of color shift can be improved, and better image display quality can be obtained.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description with reference to the accompanying drawings, wherein the same references relate to the same elements.

It is to be specified that the LCD device according to each embodiment of the invention may be a multi-domain vertically aligned (MVA) LCD device, a twisted-nematic LCD device, an optically compensated bend OCB LCD device, an axisymmetric aligned (ASM) LCD device or an in-plane switching (IPS) LCD device. In addition, the driving method of the LCD device according to each embodiment of the invention may be a dot inversion driving method, in which a data signal applied to a pixel unit and a data signal applied to the neighboring pixel units have opposite polarities in the same frame period. Also, the driving method may be a column inversion driving method, a row inversion driving method, a frame inversion driving method or any other many-dots inversion driving method.

First Embodiment

Figure 9:
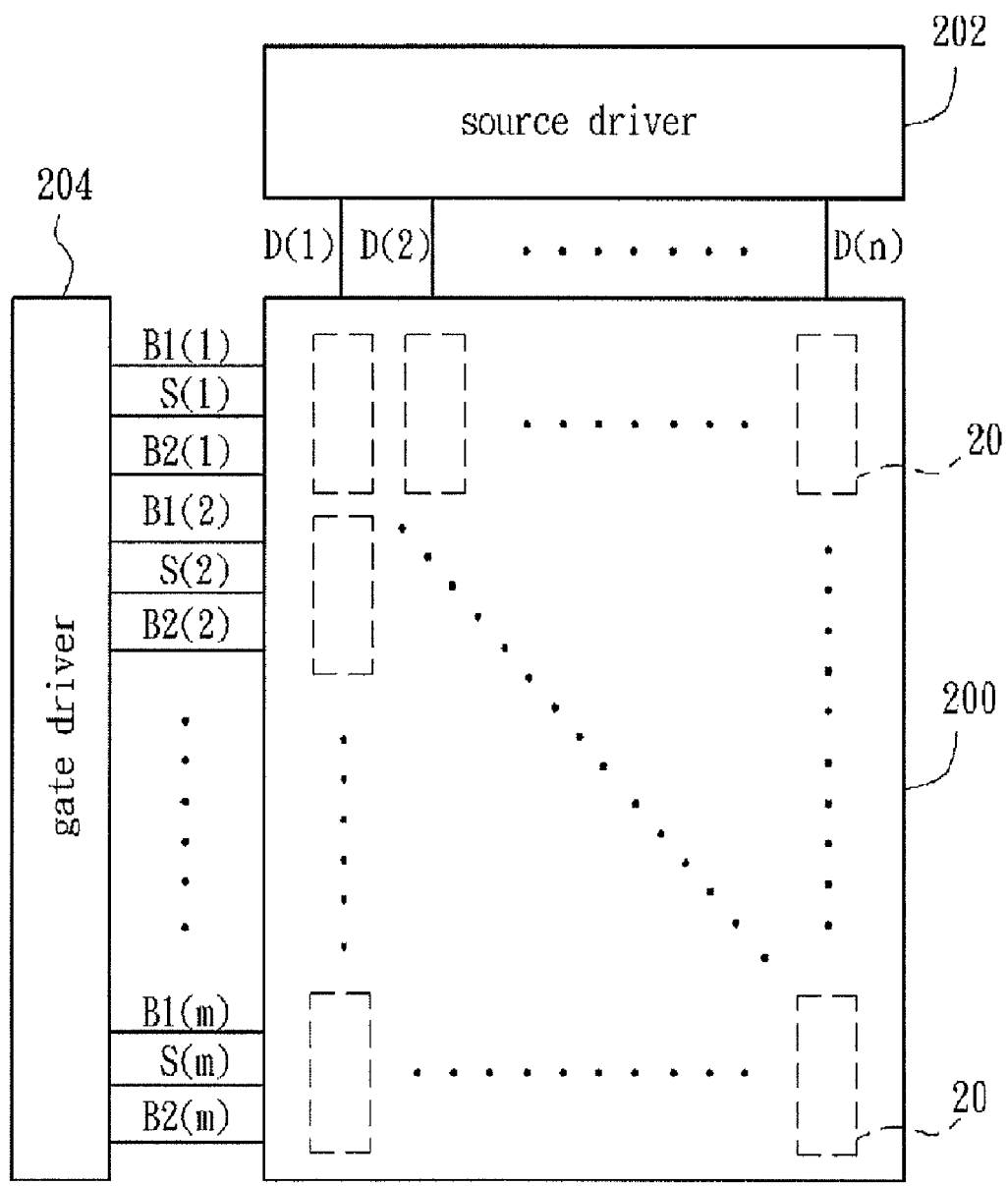
FIG. 9 depicts a multi-domain LCD device according to a first embodiment of the invention.

FIG. 9 is an overall schematic illustration depicting a multi-domain LCD device 2 according to a first embodiment of the invention. Referring to FIG. 9, the multi-domain LCD device 2 includes a liquid crystal panel 200, a source driver 202 and a gate driver 204. The liquid crystal panel 200 includes n×m pixels 20. The source driver 202 transfers display data to the pixels 20 through data lines D(1) to D(n). The gate driver 204 transfers scan signals to the liquid crystal panel 200 through scan lines S(1) to S(m) to sequentially turn on each column of pixels 20, and transfers a first bias signal and a second bias signal to each of the pixels 20 on the liquid crystal panel 200 through first storage capacitor lines B1(1) to B1(m) and second storage capacitor lines B2(1) to B2(m). The data lines D(1) to D(n) are formed on the liquid crystal panel 200 along a first direction and provide an input voltage. The scan lines S(1) to S(m) are formed on the liquid crystal panel 200 along a second direction.

Pixels 20 are formed at intersections between the data lines D(1) to D(n) and the scan lines S(1) to S(m). Each pixel 20 includes a first sub-pixel and a second sub-pixel. The first sub-pixel includes a first switch, a first liquid crystal capacitor and a first storage capacitor. The first switch has a first terminal connected to one of the scan lines S(1) to S(m), a second terminal connected to one of the data lines D(1) to D(n), and a third terminal connected to a first terminal of the first liquid crystal capacitor and a first terminal of the first storage capacitor. The second sub-pixel includes a second switch, a second liquid crystal capacitor and a second storage capacitor.

The second switch has a first terminal connected to one of the scan lines S(1) to S(m), a second terminal connected to one of the data lines D(1) to D(n), and a third terminal connected to a first terminal of the second liquid crystal capacitor and a first terminal of the second storage capacitor. A first storage capacitor line is electrically connected to a second terminal of the first storage capacitor, and a second storage capacitor line is electrically connected to a second terminal of the second storage capacitor. The structures of the first sub-pixel and the second sub-pixel will be described later.

When the scan lines S(1) to S(m) are enabled, the first switch and the second switch turn on so that the signals on the data lines D(1) to D(n) are transferred to the first sub-pixel and the second sub-pixel. Next, when the scan lines S(1) to S(m) are disabled, levels of the first storage capacitor lines B1(1) to B1(m) and the second storage capacitor lines B2(1) to B2(m) are changed so that a first offset voltage is generated between the pixel voltage of the first sub-pixel and the input voltage, and a second offset voltage is generated between the pixel voltage of the second sub-pixel and the input voltage. Thus, the pixel voltage of the first sub-pixel is different from the pixel voltage of the second sub-pixel, and the first offset voltage is different from the second offset voltage.

Figure 10:
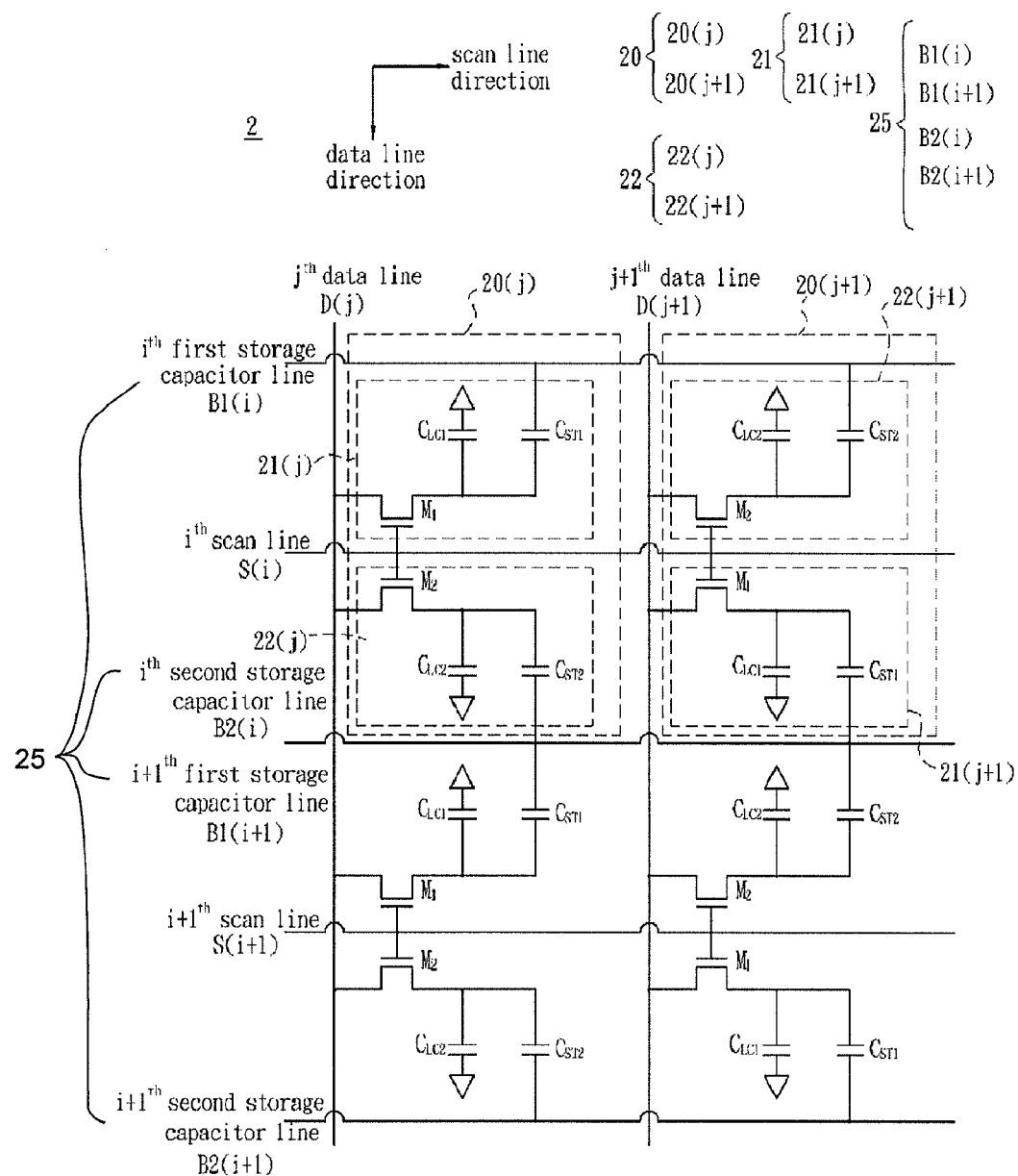
FIG. 10 depicts an equivalent circuit of a pixel in an LCD device according to the first embodiment of the invention.

Referring to FIG. 10, the LCD device 2, according to the preferred embodiment of the invention, includes a plurality of pixels 20 arranged in a matrix. Each pixel 20 includes a first sub-pixel 21 and a second sub-pixel 22. For example, the pixel 20(j) includes a first sub-pixel 21(j) and a second sub-pixel 22(j), the pixel 20(j+1) includes a first sub-pixel 21(j+1) and a second sub-pixel 22(j+1), and so on.

In this embodiment, each sub-pixel includes a liquid crystal capacitor, a storage capacitor and a switch element. Referring to FIG. 10, each first sub-pixel 21 includes a liquid crystal capacitor $C_{LC1}$, a storage capacitor $C_{ST1}$ and a switch element $M_1$. Each second sub-pixel 22 includes a liquid crystal capacitor $C_{LC2}$, a storage capacitor $C_{ST2}$ and a switch element $M_2$. In this embodiment, each of the switch element $M_1$ and the switch element $M_2$ may be a thin film transistor (TFT) or a MIM switch element. In addition, the LCD device 2 further includes a plurality of scan lines S(1) to S(m), a plurality of data lines D(1) to D(n) and a plurality of storage capacitor lines 25. The storage capacitor lines 25 include the plurality of first storage capacitor lines B1(1) to B1(m) and the plurality of second storage capacitor lines B2(1) to B2(m). In this embodiment, the scan lines S(1) to S(m) and the storage capacitor lines 25 are disposed in parallel and alternately, and the data lines D(1) to D(n) are perpendicular to the scan lines S(1) to S(m).

A description of FIG. 10 will be provided using some pixel 20(j) as an example. The $i^{th}$ scan line S(i) is disposed between the first sub-pixel 21 and the second sub-pixel 22 and connected to gates of the switch element $M_1$ and the switch element $M_2$ to control switching states of the switch element $M_1$ and the switch element $M_2$. The $j^{th}$ data line D(j) is connected to the liquid crystal capacitor $C_{LC1}$ and the storage capacitor $C_{ST1}$ through the switch element $M_1$, and is connected to the liquid crystal capacitor $C_{LC2}$ and the storage capacitor $C_{ST2}$ through the switch element $M_2$. In addition, the storage capacitor $C_{ST1}$ and the storage capacitor $C_{ST2}$ are respectively connected to the $i^{th}$ first storage capacitor line B1(i) and the $i^{th}$ second storage capacitor line B2(i), wherein the $i^{th}$ second storage capacitor line B2(i) and the $(i+1)^{th}$ first storage capacitor line B1(i+1) in this embodiment share the same physical circuit layout.

As disclosed above, when the $i^{th}$ scan line S(i) outputs signals to control the switching states of the switch element $M_1$ and the switch element $M_2$ to be ON, the corresponding $j^{th}$ data line D(j) is configured to input a data line signal to the liquid crystal capacitor $C_{LC1}$ and the storage capacitor $C_{ST1}$ of the corresponding first sub-pixel 21, and to the liquid crystal capacitor $C_{LC2}$ and the storage capacitor $C_{ST2}$ of the corresponding second sub-pixel 22.

The structure of each liquid crystal capacitor and each storage capacitor and the connections between the data lines and the storage capacitor lines is described as follows. In this embodiment, each liquid crystal capacitor is defined by a common electrode, a liquid crystal layer and a sub-pixel electrode, and the common electrode and the sub-pixel electrode are disposed opposite to each other through the liquid crystal layer. In addition, each storage capacitor is defined by a storage electrode, an insulating layer and a storage common electrode, and the storage common electrode and the storage electrode are disposed opposite to each other through the insulating layer. The storage electrode is electrically connected to the sub-pixel electrode, and is electrically connected to the corresponding data line through the corresponding switch element. In addition, the common electrode of the first sub-pixel and the common electrode of the second sub-pixel are electrically connected to each other and may be grounded, and the storage common electrode of the first sub-pixel and the storage common electrode of the second sub-pixel are disposed separately in any pixel. That is, the storage common electrode of the first sub-pixel and the storage common electrode of the second sub-pixel are respectively coupled to the neighboring two storage capacitor lines.

The signals on the neighboring two storage capacitor lines have the same amplitude, and the phase difference is equal to a clock of one scan signal. That is, the levels of the first storage capacitor lines B1(1) to B1(m) and the second storage capacitor lines B2(1) to B2(m) are changed at different time instants in the same frame time. Also, the levels of the first storage capacitor lines B1(1) to B1(m) and the second storage capacitor lines B2(1) to B2(m) may be changed at the same time instant in the same frame time.

Figure 11A:
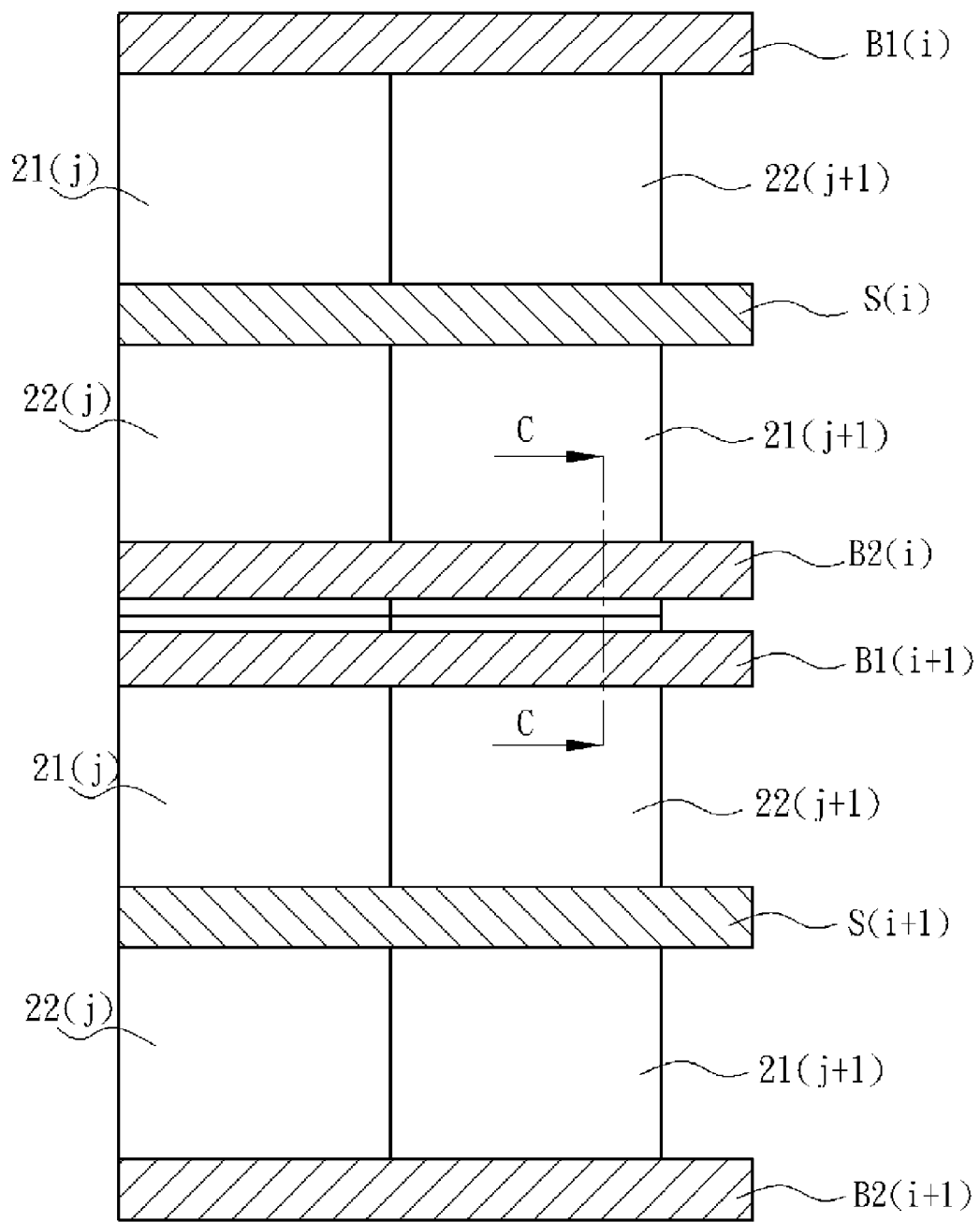
FIG. 11A depicts a liquid crystal panel according to the first embodiment of the invention.

In addition, the liquid crystal panel 200 of the first embodiment may have several structures. Four examples are provided to clarify the structure and operation of panel 200. FIG. 11A is a schematic illustration depicting the liquid crystal panel 200 according to the first embodiment. The liquid crystal panel 200 includes a plurality of first sub-pixels 21(j) and 21(j+1) and a plurality of second sub-pixels 22(j) and 22(j+1), and includes a plurality of scan lines S(i) and S(i+1), a plurality of first storage capacitor lines B1(i) and B1(i+1) and a plurality of second storage capacitor lines B2(i) and B2(i+1). FIGS. 11B to 11E are cross-sectional views taken along C-C' lines of various structures of the liquid crystal panel 200 of FIG. 11A. In addition, the $i^{th}$ second storage capacitor line B2(i) and the (i+1)$^{th}$ first storage capacitor line B1(i+1) of this embodiment may also not share the same physical circuit layout.

Figure 11B:
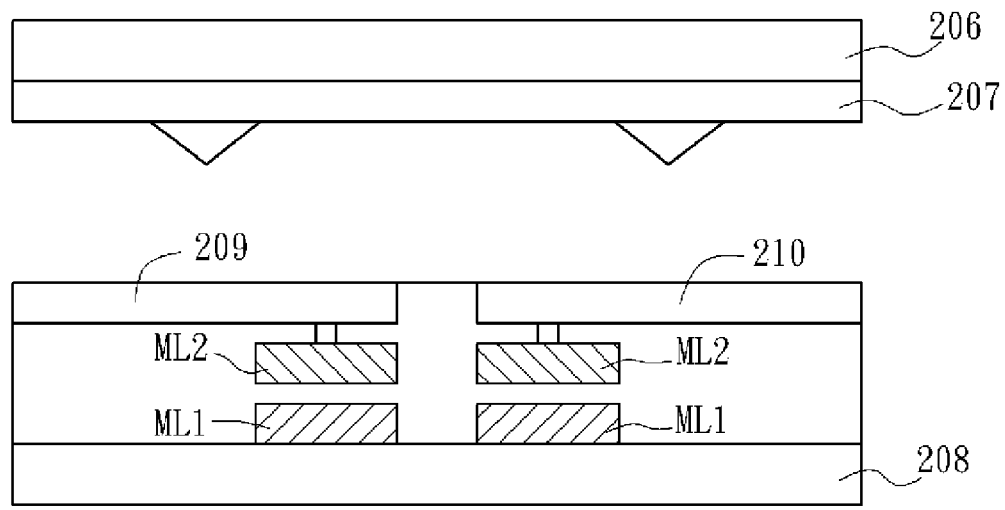
FIGS. 11B to 11E are cross-sectional views taken along C-C' lines of various structures of the liquid crystal panel of FIG. 11A.

Referring to FIG. 11B, the liquid crystal panel 200 includes an upper substrate 206, a common electrode 207, a lower substrate 208, transparent electrodes 209 and 210, first metal layers ML1 and second metal layers ML2. The two second metal layers ML2 respectively couple the transparent electrodes 209 and 210 to the data lines D(1) to D(n). The two first metal layers ML1 constitute the first storage capacitor line B1 and the second storage capacitor line B2. The first metal layer ML1 and its corresponding second metal layer ML2 constitute the storage capacitor $C_{ST1}$ or $C_{ST2}$.

Figure 11C:
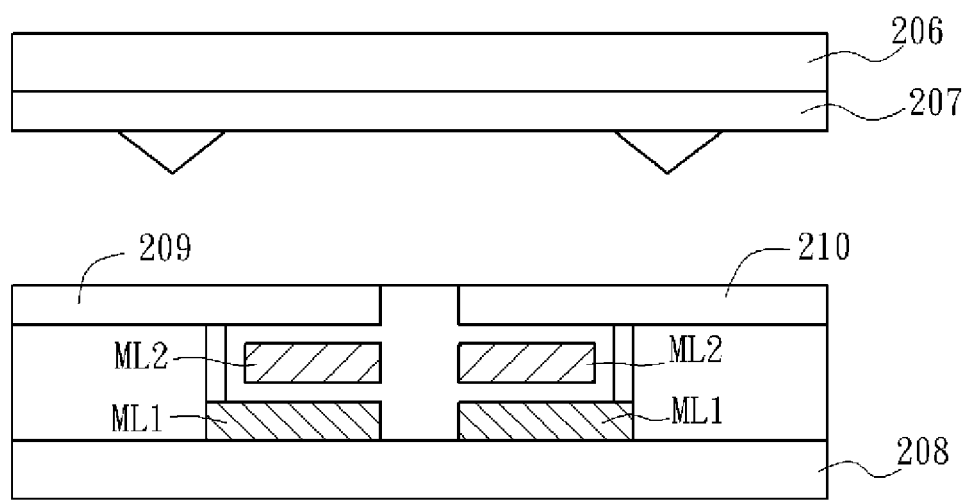

FIG. 11C is a cross-sectional view taken along the C-C' line of the second structure of the liquid crystal panel 200 of FIG. 11A. The second structure is different from the first structure of FIG. 11A in that the transparent electrodes 209 and 210 are electrically connected to the first metal layers ML1, and the second metal layers ML2 constitute the first storage capacitor line B1 and the second storage capacitor line B2.

Figure 11D:
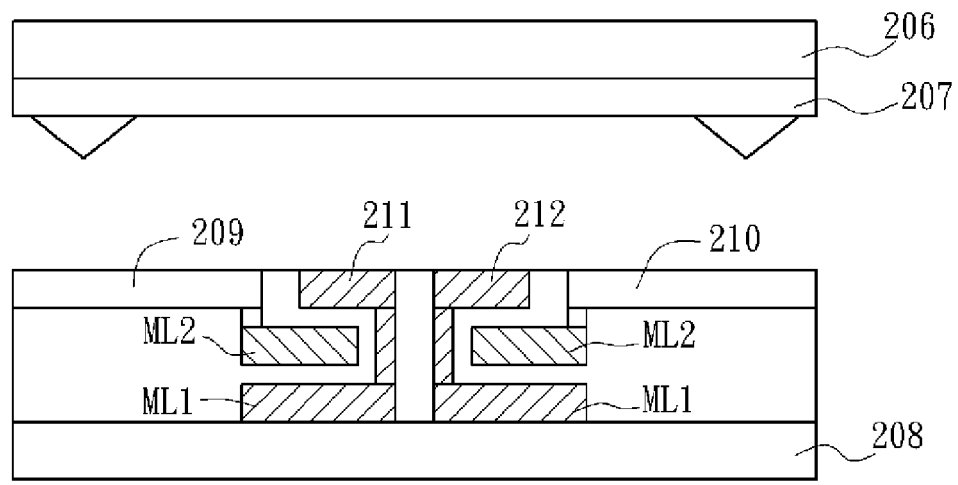

FIG. 11D is a cross-sectional view taken along the C-C' line of the third structure of the liquid crystal panel 200 of FIG. 11A. The third structure is different from the first structure in that the first metal layers ML1 are further electrically connected to transparent electrodes 211 and 212 to increase the capacitances of the storage capacitors $C_{ST1}$ and $C_{ST2}$.

Figure 11E:
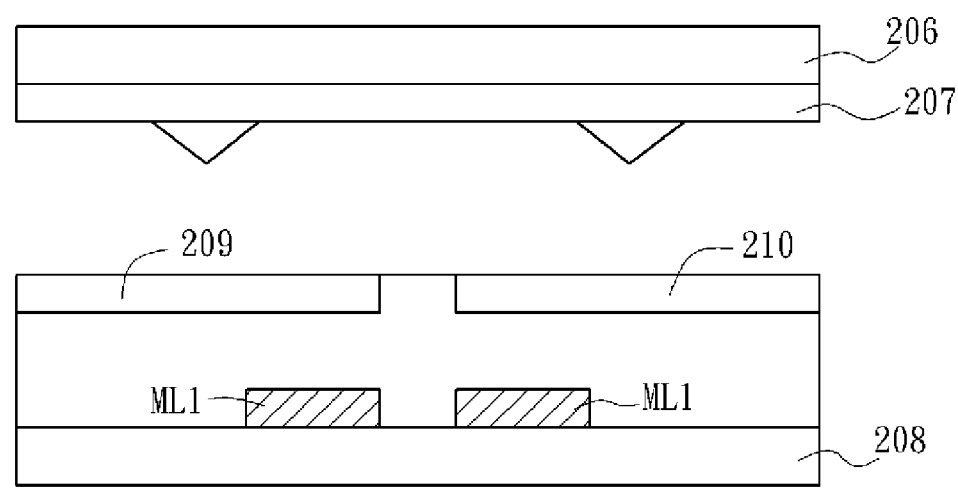

FIG. 11E is a cross-sectional view taken along the C-C' line of the fourth structure of the liquid crystal panel 200 of FIG. 11A. The fourth structure is different from the first structure in that the second metal layers are removed. It is to be noted that the designs of the storage capacitor lines (or bias lines) in the structures of the liquid crystal panel are made by way of examples without limiting the scope of the invention. One of ordinary skill in the art may easily understand that other structures may be adopted to achieve the same effect and will be deemed as being covered by this invention.

In addition, the storage common electrode of the second sub-pixel of any one pixel and the storage common electrode of the first sub-pixel of the next or previous pixel disposed along the data line direction may be simultaneously connected to the same storage capacitor line, which includes one first storage capacitor line B1 and one second storage capacitor line B2.

Figure 12:
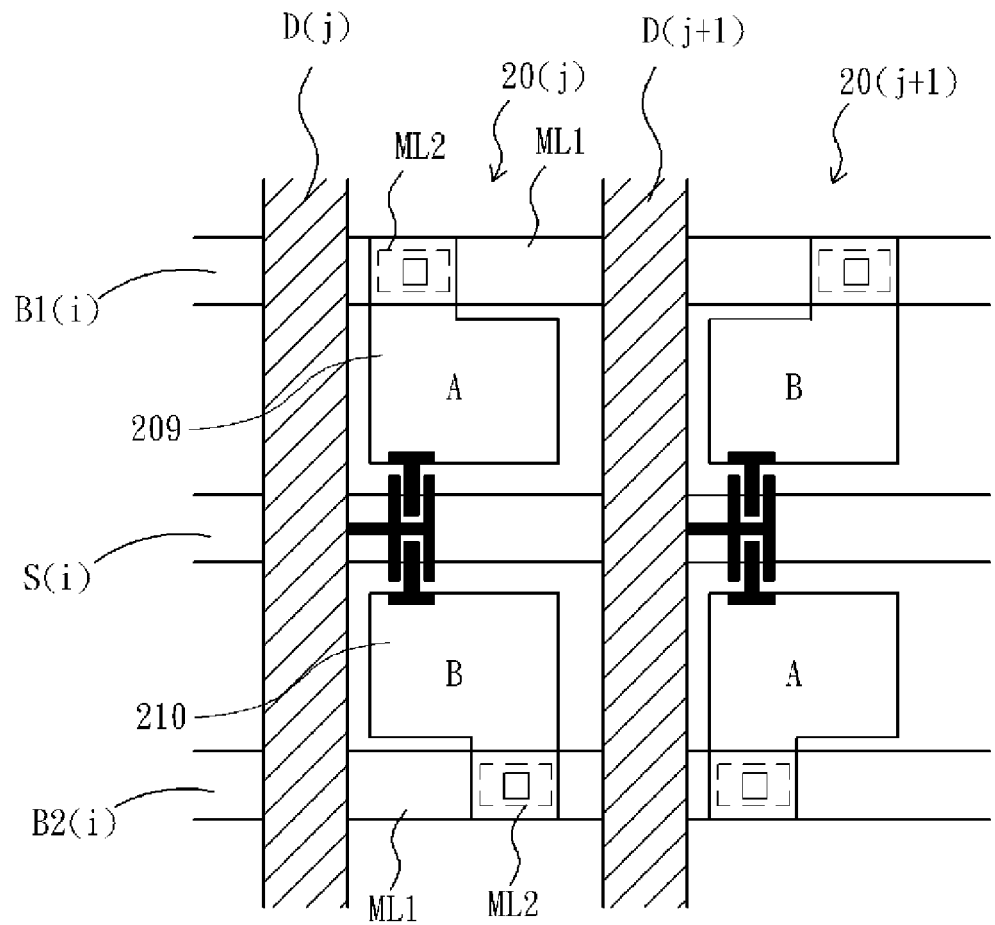
FIG. 12 depicts the circuit layout of the LCD device of FIG. 10.

Referring to FIG. 10 and the two neighboring pixels 20(j) and 20(j+1) disposed along the scan line direction, the first sub-pixel 21(j) of the pixel 20(j) and the first sub-pixel 21(j+1) of the next pixel 20(j+1) are staggered, and the second sub-pixel 22(j) of the pixel 20(j) and the second sub-pixel 22(j+1) of the next pixel 20(j+1) are staggered. FIG. 12 is a schematic illustration depicting a circuit layout of the neighboring two pixels 20(j) and 20(j+1), wherein the area A represents the display area of the first sub-pixel 21(j) and the area B represents the display area of the second sub-pixel 22(j). As depicted in FIGS. 11B and 12, the area A in FIG. 12 is the transparent electrode 209 in FIG. 11B, the area B in FIG. 12 is the transparent electrode 210 in FIG. 11B, the storage capacitor lines B1(i) and B2(i) in FIG. 12 are the first metal layers ML1 in FIG. 11B, and the second metal layers ML2 in FIG. 11B are located at the overlapped portions of the storage capacitor lines B1(i) and B2(i) and the areas A and B. As depicted in FIG. 12, the first sub-pixels 21(j) and 21(j+1) of the neighboring two pixels 20(j) and 20(j+1) are staggered, and the second sub-pixels 22(j) and 22(j+1) of the neighboring two pixels 20(j) and 20(j+1) are also staggered.

In this embodiment, the first sub-pixel 21(j) of the pixel 20(j) and the first sub-pixel 21(j+1) of the neighboring next pixel 20(j+1) are substantially mirrored and staggered, and the second sub-pixel 22(j) of the pixel 20(j) and the second sub-pixel 22(j+1) of the next pixel 20(j+1) are also substantially mirrored and staggered in the neighboring two pixels 20(j) and 20(j+1) disposed along the scan line direction, as depicted in FIG. 10. More specifically, the mirrored image of the first sub-pixel 21(j) of the pixel 20(j) is first obtained at the position of the second sub-pixel 22(j) with the junction (i.e., the $i^{th}$ scan line S(i)) between the first sub-pixel 21(j) and the second sub-pixel 22(j) serving as the symmetrical axis. Next, the mirrored image is moved by one pixel along the scan line direction to obtain the first sub-pixel 21(j+1) of the next pixel 20(j+1). Thus, the first sub-pixel 21(j) and the first sub-pixel 21(j+1) are substantially mirrored and staggered in this embodiment.

Similarly, the mirrored image of the second sub-pixel 22(j) of the some pixel 20(j) is obtained at the position of the first sub-pixel 21(j) with the junction (i.e., the $i^{th}$ scan line S(i)) between the first sub-pixel 21(j) and the second sub-pixel 22(j) serving as the symmetrical axis. Then, the mirrored image is moved by one pixel along the scan line direction so that the second sub-pixel 22(j+1) of the next pixel 20(j+1) is obtained. Thus, the second sub-pixel 22(j) and the second sub-pixel 22(j+1) are substantially mirrored and staggered in this embodiment.

As depicted in FIG. 10, the capacitance ratio of the storage capacitor $C_{ST1}$ to the liquid crystal capacitor $C_{LC1}$ in the first sub-pixel 21(j) or 21(j+1) is smaller than the capacitance ration of the storage capacitor $C_{ST2}$ to the liquid crystal capacitor $C_{LC2}$ of the second sub-pixel 22(j) or 22(j+1) in any pixel 20(j) or 20(j+1). That is, $C_{ST1}/C_{LC1} < C_{ST2}/C_{LC2}$.

Figure 13:
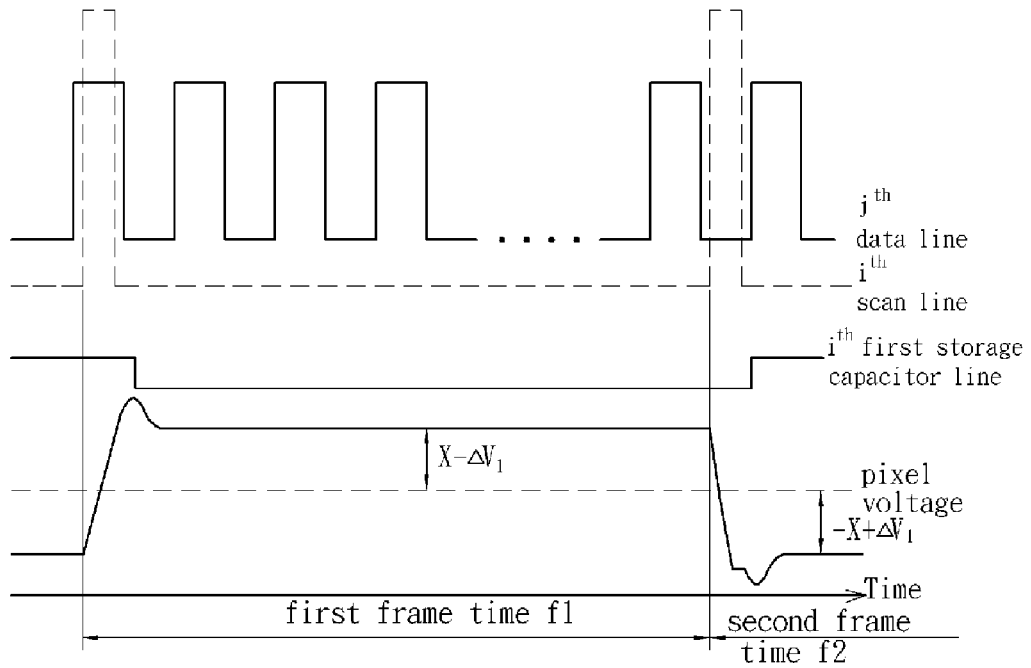
FIG. 13 depicts timing diagrams enabling operations in areas A and B of FIG. 12.
Figure 13:
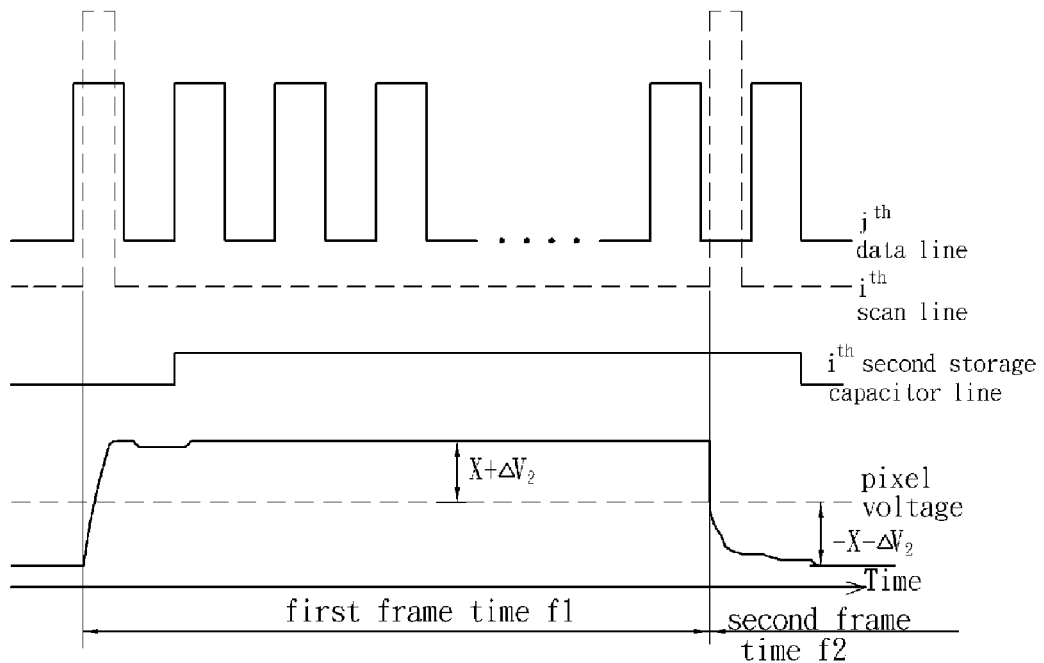

Next, FIG. 13 depicts the operational timing for enabling one pixel 20(j) or 20(j+1). The embodiments are explained using the dot inversion polarity switching method as an example, in which the pixel voltages in the neighboring frame times have different polarities in the same pixel, and the pixel voltages of the neighboring pixels also have different polarities. Taking the area A (see FIG. 12) as an example, the $i^{th}$ first storage capacitor line B1(i) turns to the low voltage level after the $i^{th}$ scan line S(i) outputs the scan signal in a first frame time f1. Thus, the pixel voltage (i.e., the capacitance of the liquid crystal capacitor $C_{LC1}$) in the area A is influenced by the storage capacitor $C_{ST1}$ and is slightly decreased from the original "X" to "X−$\Delta V_1$".

In the second frame time f2, the $i^{th}$ first storage capacitor line B1(i) again turns to the high voltage level after the $i^{th}$ scan line S(i) outputs the next scan signal. At this time, the pixel voltage (i.e., the capacitance of the liquid crystal capacitor $C_{LC1}$) in the area A is influenced by the storage capacitor $C_{ST1}$ and is slightly increased from the original "−X" to "−X+$\Delta V_1$". Thus, the luminance of the area A is slightly decreased. In addition, taking the area B as an example, the $i^{th}$ second storage capacitor line B2(i) turns to the high voltage level after the $i^{th}$ scan line S(i) has outputted the pulse signal and one half clock is elapsed in the first frame time f1. Thus, the pixel voltage (i.e., the capacitance of the liquid crystal capacitor $C_{LC2}$) in the area B is influenced by the storage capacitor $C_{ST2}$ and is slightly increased from the original "X" to "X+$\Delta V_2$". Then, in the second frame time f2, the $j^{th}$ second storage capacitor line B2(i) again turns back to the low voltage level after the $i^{th}$ scan line S(i) has outputted the next pulse signal and one half clock has elapsed. At this time, the pixel voltage (i.e., the capacitance of the liquid crystal capacitor $CLC_2$) in the area B is influenced by the storage capacitor $C_{ST2}$ and is slightly decreased from the original "–X" to "–X–$\Delta V_2$" so that the luminance of the area B is slightly increased. As mentioned hereinabove, it is obtained that $\Delta V_1 < \Delta V_2$ since ($C_{ST1}/C_{LC1} < C_{ST2}/C_{LC2}$). Compared the area A with the area B, it is found that the luminance of the area B is slightly higher than the luminance of the area A, and the areas A and B may be respectively defined as the dark zone and the bright zone.

Furthermore, the pixel voltage difference of the first sub-pixel 21(j) or 21(j+1) is "X–$\Delta V_1$" in the first frame time f1 or "–X+$\Delta V_1$" in the second frame time f2 so that a lower gray-scale value is generated, for example, and the pixel voltage difference of the second sub-pixel 22(j) or 22(j+1) is "X+$\Delta V_2$" in the first frame time f1 or "–X–$\Delta V_2$" in the second frame time f2 so that a higher gray-scale value is generated.

In addition, the capacitance ratio of the storage capacitor $C_{ST1}$ to the liquid crystal capacitor $C_{LC1}$ in the first sub-pixel 21(j) or 21(j+1) is smaller than that of the storage capacitor $C_{ST2}$ to the liquid crystal capacitor $C_{LC2}$ in the second sub-pixel 22 ($C_{ST1}/C_{LC1} < C_{ST2}/C_{LC2}$). That is, $\Delta V_1$ is smaller than $\Delta V_2$, so the decreasing rate of the luminance in the area A is smaller than the increasing rate of the luminance in the area B.

For example, if X is 5 volts, $\Delta V_1$ is 0.2 volts and $\Delta V_2$ is 0.8 volts, then the pixel voltage difference in the area A is equal to 5–0.2=4.8 volts, and the pixel voltage difference in the area B is equal to 5+0.8=5.8 volts. Thus, the average pixel voltage difference of the LCD device 2, according to the preferred embodiment of the invention, may be increased to (4.8+5.8)/2=5.3 volts, which is slightly higher than the conventional average pixel voltage difference (5 volts).

Figure 8:
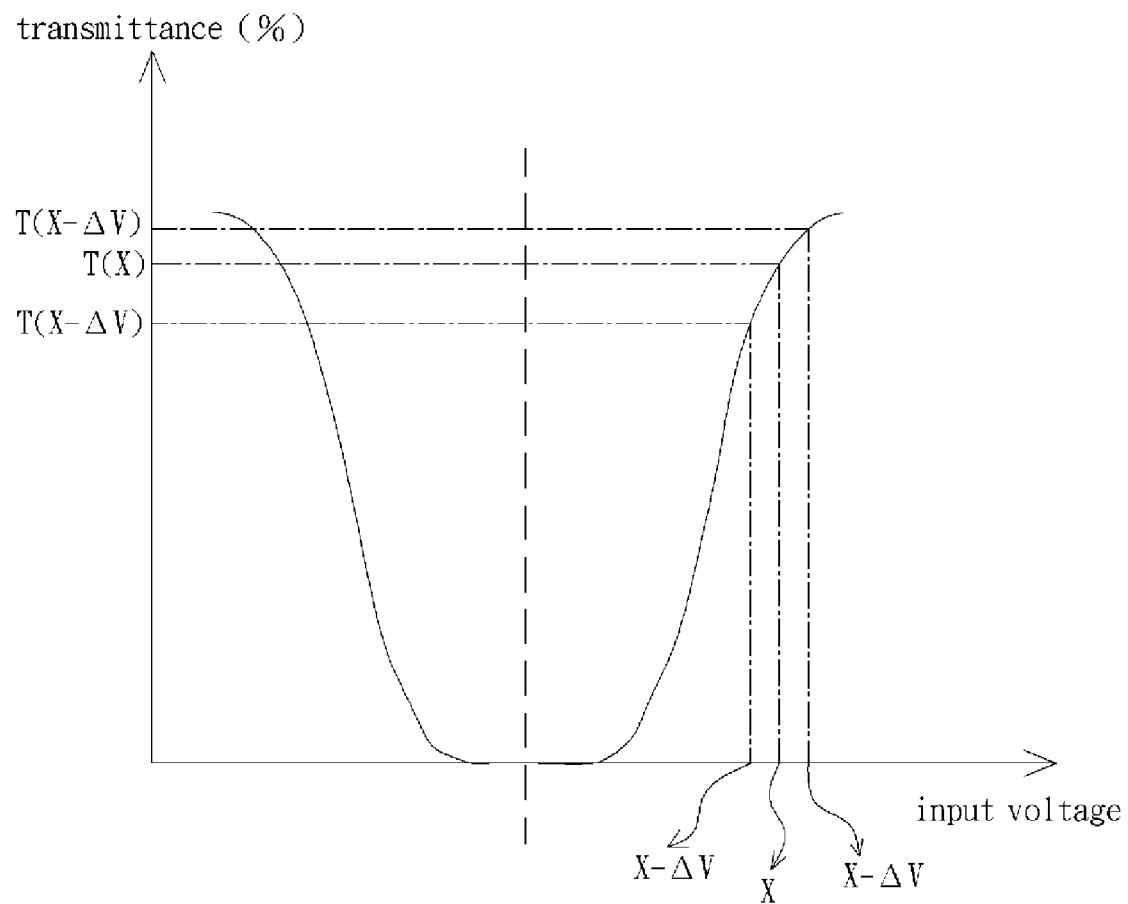
FIG. 8 is a graph depicting the relationship between the transmittance and an input voltage in the conventional LCD device.
Figure 14:
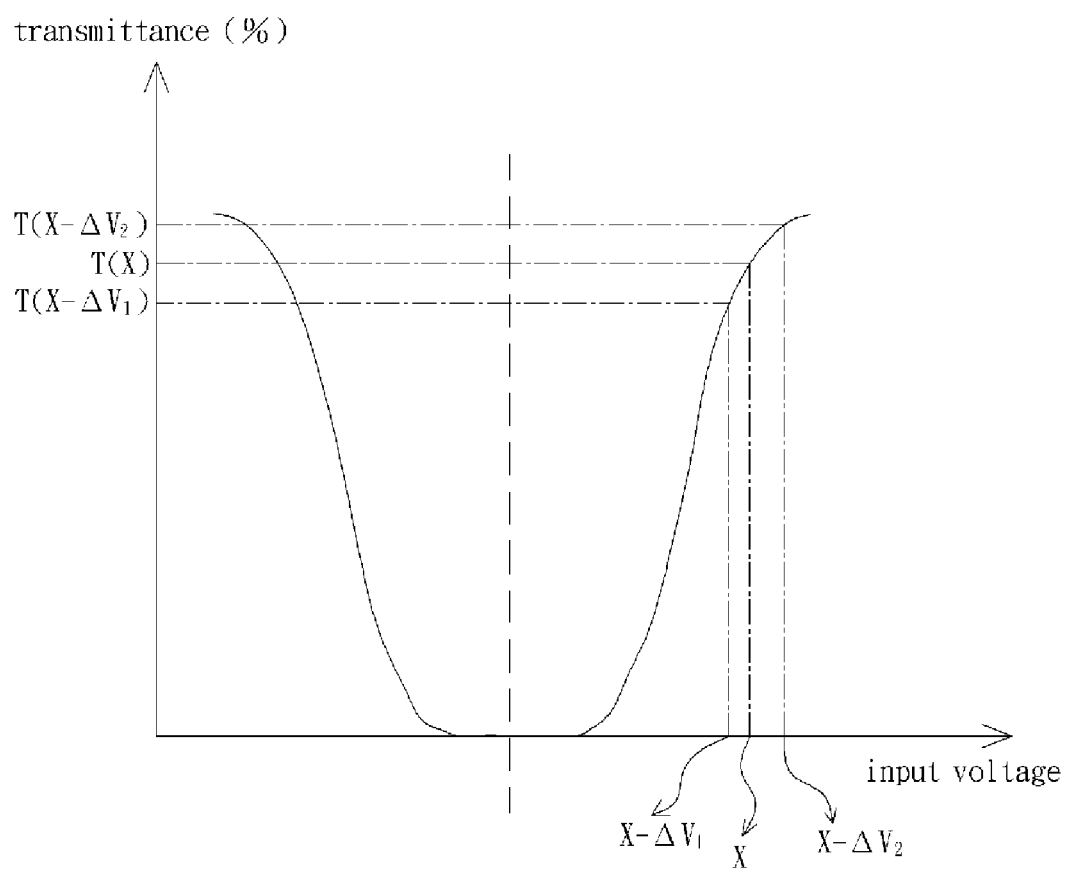
FIG. 14 depicts the relationship between the transmittance and an input voltage in the LCD device according to the first embodiment of the invention.

In addition, comparing FIG. 8 with FIG. 14, when the input voltage X is at the high transmittance representation, the decreasing rate of the transmittance T(X–$\Delta V_1$) of this embodiment is smaller than the decreasing rate of the conventional transmittance T(X–$\Delta V$), which means that the difference between T(X–$\Delta V_1$) and T(X) is smaller than the difference between T(X–$\Delta V$) and T(X)), and the increasing rate of the transmittance T(X+$\Delta V_2$) of this embodiment is higher than that of the conventional transmittance T(X+$\Delta V$), which means that the difference between T(X+$\Delta V_2$) and T(X) is higher than that between T(X+$\Delta V$) and T(X).

Therefore, each luminance in the higher gray-scale area and the lower gray-scale area according to this embodiment is higher than each luminance in the higher gray-scale area and the lower gray-scale area according to the prior art. Consequently, the invention can adjust the luminance of each of the first sub-pixels 21(j) and 21(j+1) and the second sub-pixels 22(j) and 22(j+1) according to the values of $\Delta V_1$ and $\Delta V_2$. Furthermore, the invention can effectively enhance the overall luminance of the LCD device and thus obtain the better γ property of the low color difference.

Second Embodiment

Figure 15:
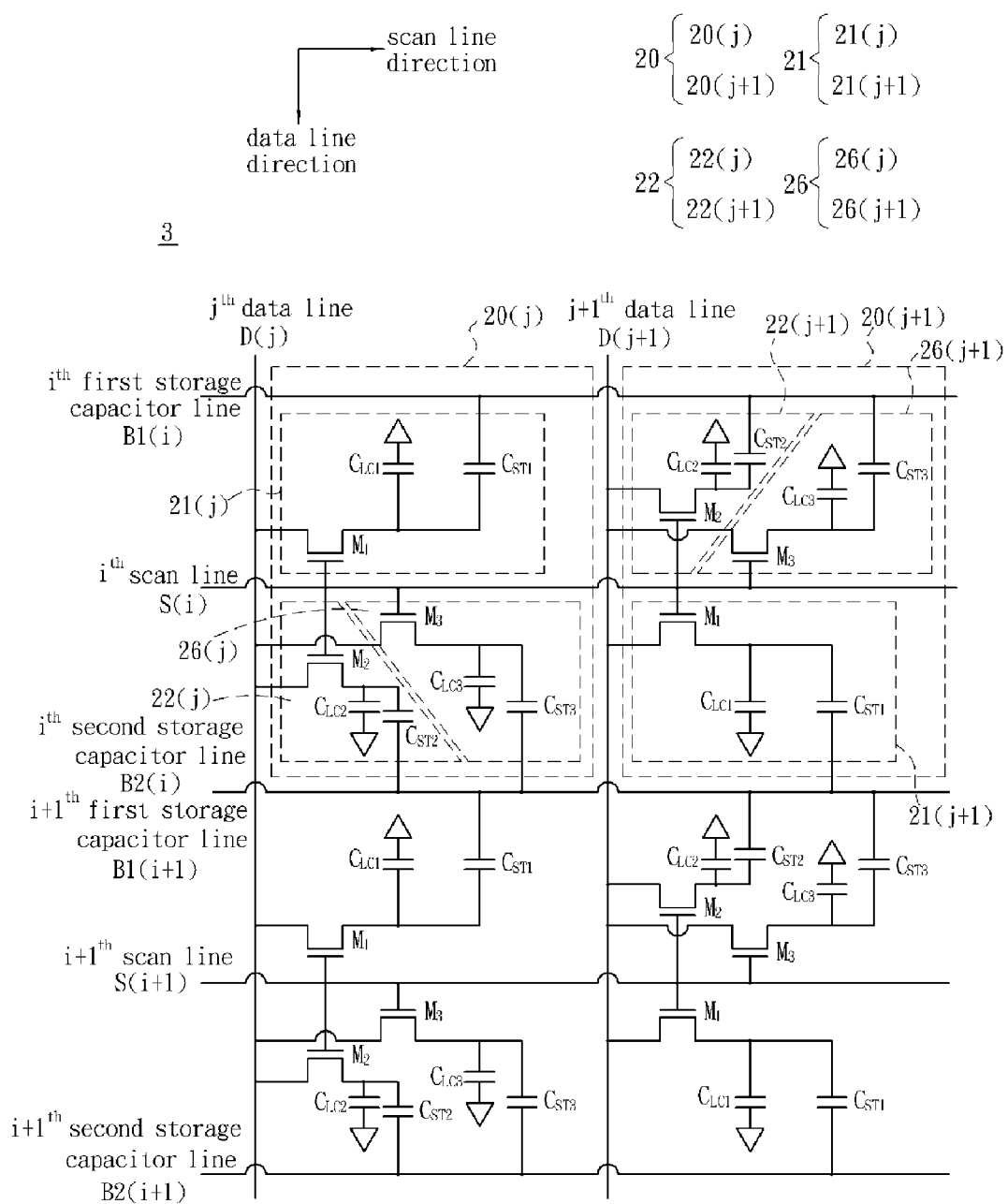
FIG. 15 is a schematic illustration depicting an equivalent circuit of a pixel in an LCD device according to a second embodiment of the invention.

FIG. 15 depicts a multi-domain LCD device 3 according to a second embodiment of the invention. In this embodiment, each pixel 20 further includes a third sub-pixel 26, which includes a liquid crystal capacitor $C_{LC3}$, a storage capacitor $C_{ST3}$ and a switch element $M_3$. In addition, a capacitance ratio of the storage capacitor $C_{ST2}$ to the liquid crystal capacitor $C_{LC2}$ in the second sub-pixel 22 is smaller than that of the storage capacitor $C_{ST3}$ to the liquid crystal capacitor $C_{LC3}$ in the third sub-pixel 26 ($C_{ST2}/C_{LC2} < C_{ST3}/C_{LC3}$) in this embodiment. Also, in the neighboring two pixels 20(j) and 20(j+1) of this embodiment, the third sub-pixel 26(j) of the pixel 20(j) and the third sub-pixel 26(j+1) of the neighboring next pixel 20(j+1) are staggered. In the neighboring two pixels 20(j) and 20(j+1) disposed along the scan line direction according to this embodiment, the first sub-pixel 21(j), the second sub-pixel 22(j) and the third sub-pixel 26(j) of the pixel 20(j) and the first sub-pixel 21(j+1), the second sub-pixel 22(j+1) and the third sub-pixel 26(j+1) of the next pixel 20(j+1) are substantially mirrored and staggered.

As disclosed above, the sub-pixels may be staggered about a center of a junction between two pixels serving as the symmetrical axis, or mirrored about the junction of the sub-pixels serving as the symmetrical line. In this embodiment, for example, the junction (i.e., the $i^{th}$ scan line S(i)) between the first sub-pixel 21(j) and the second sub-pixel 22(j) serves as the symmetrical axis, and the mirrored image of the first sub-pixel 21(j) of the pixel 20(j) is obtained at the positions of the second sub-pixel 22(j) and the third sub-pixel 26(j). Then, the mirrored image is moved by one pixel along the scan line direction to obtain the first sub-pixel 21(j+1) of the next pixel 20(j+1). Thus, the first sub-pixel 21(j) and the first sub-pixel 21(j+1) are substantially mirrored and staggered in this embodiment.

Similarly, the junction (i.e., the $i^{th}$ scan line S(i)) between the first sub-pixel 21(j) and the second sub-pixel 22(j) serves as the symmetrical axis, and the mirrored image of the combination of the second sub-pixel 22(j) and the third sub-pixel 26(j) of the pixel 20(j) at the position of the first sub-pixel 21(j) is obtained. Then, the mirrored image is moved by one pixel along the scan line direction to obtain the combination of the second sub-pixel 22(j+1) and the third sub-pixel 26(j+1) of the next pixel 20(j+1). Thus, the combination of the second sub-pixel 22(j) and the third sub-pixel 26(j) and the combination of the second sub-pixel 22(j+1) and the third sub-pixel 26(j+1) are substantially mirrored and staggered in this embodiment.

Figure 16:
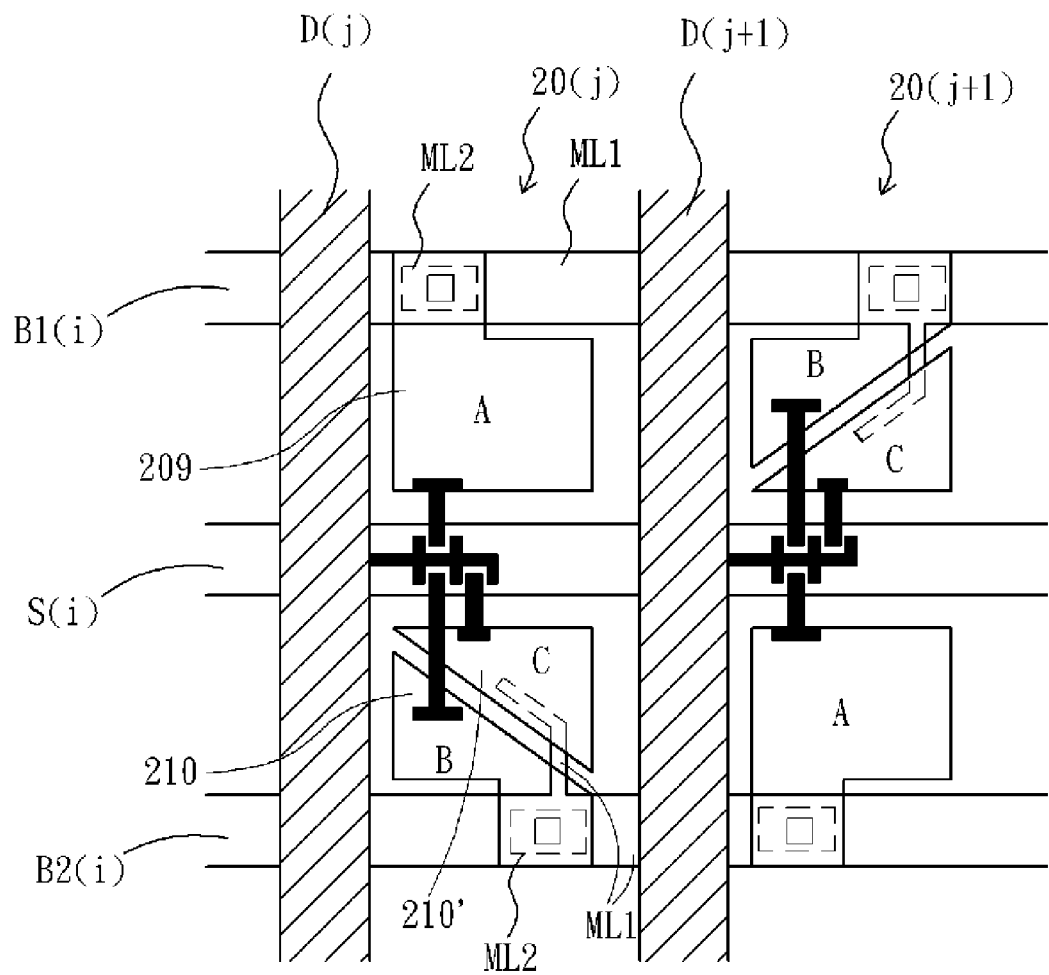
FIG. 16 is a schematic illustration depicting the circuit layout of the LCD device of FIG. 15.

FIG. 16 is a schematic illustration depicting the circuit layout of the neighboring two pixels 20(j) and 20(j+1), wherein the area A represents the display area of the first sub-pixels 21(j) and 21(j+1), the area B represents the display area of the second sub-pixels 22(j) and 22(j+1), and the area C represents the display area of the third sub-pixels 26(j) and 26(j+1). As depicted in FIGS. 11B and 16, the area A in FIG. 16 is the transparent electrode 209 in FIG. 11B, the area B in FIG. 16 is the transparent electrode 210 in FIG. 11B, the area C in FIG. 16 is also a transparent electrode 210' (not as depicted in FIG. 11B), the storage capacitor lines B1(i) and B2(i) in FIG. 16 are the first metal layers ML1 in FIG. 11B, and the second metal layers ML2 of FIG. 11B are located at the overlapped portions of the storage capacitor lines B1(i) and B2(i) and the areas A and B. As depicted in FIG. 16, the first sub-pixels 21(j) and 21(j+1), the second sub-pixels 22(j) and 22(j+1) and the third sub-pixels 26(j) and 26(j+1) in the neighboring two pixels 20(j) and 20(j+1) are substantially mirrored and staggered.

Figure 7:
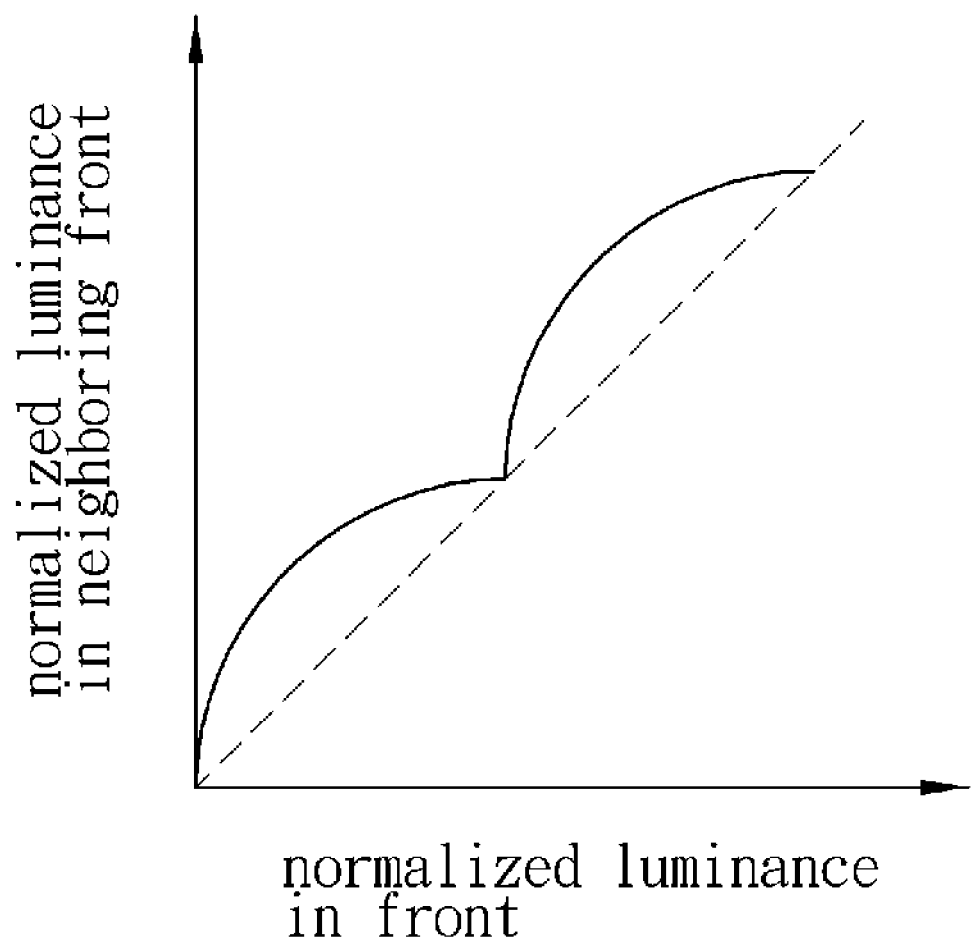
FIG. 7 is a graph depicting the relationship between normalized luminances in the conventional LCD device of FIG. 4.
Figure 17:
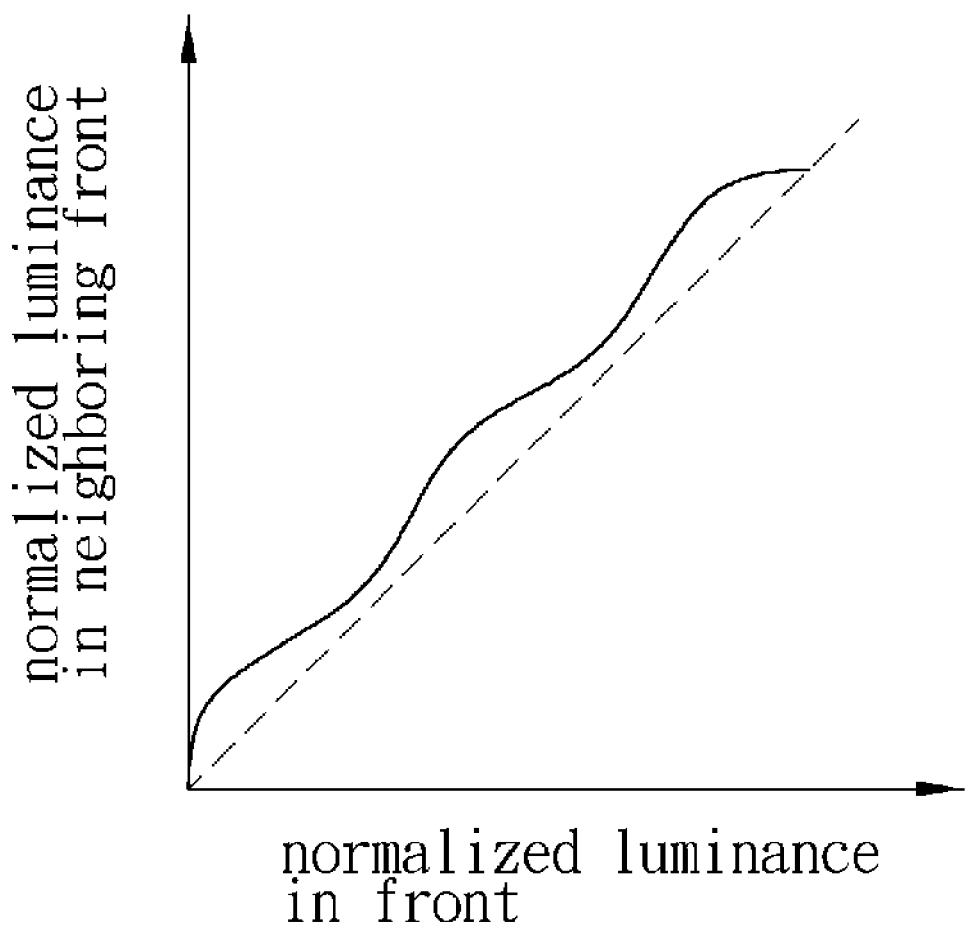
FIG. 17 is a graph depicting the relationship between normalized luminances in the LCD device of FIG. 15.

Referring to FIG. 17, this embodiment further divides one pixel into three sub-pixels, so the images viewed by the user in front of and in neighboring front of the screen have the normalized luminances, which approach the ideal condition (the straight line with the slope of 1) as compared with the prior art condition (see FIG. 7). In addition, this embodiment also is configured to improve the γ property of the LCD device 3 by controlling the luminances of three sub-pixels. For example, it is possible to control the luminance of the area C to be higher than that of the area B, and the luminance of the area B to be higher than that of the area A. Thus, after area A is compared with the combination of the areas B and C, the combination of the areas B and C is the bright zone, and area A is the dark zone.

In addition, areas A, B and C have different luminances, and the luminance differences between the areas A, B and C may be determined according to the capacitance ratio ($C_{ST1}/C_{LC1}$) of the storage capacitor $C_{ST1}$ to the liquid crystal capacitor $C_{LC1}$ in the first sub-pixel 21, the capacitance ratio ($C_{ST2}/C_{LC2}$) of the storage capacitor $C_{ST2}$ to the liquid crystal capacitor $C_{LC2}$ in the second sub-pixel 22, and the capacitance ratio ($C_{ST3}/C_{LC3}$) of the storage capacitor $C_{ST3}$ to the liquid crystal capacitor $C_{LC3}$ in the third sub-pixel 26, respectively. Accordingly, the relationship between the normalized luminances viewed in front of and in the area neighboring the front of the screen can be changed more flexibly so that the γ property of the LCD device 3 can be adjusted.

Third Embodiment

Non-limiting, one pixel may be divided into four or more than four sub-pixels in the disclosed LCD device, and the implementing method thereof may be derived by one of ordinary skill in the art according to the above-mentioned embodiments. The embodiment, in which one pixel is divided into four sub-pixels, is illustrated.

Figure 18:
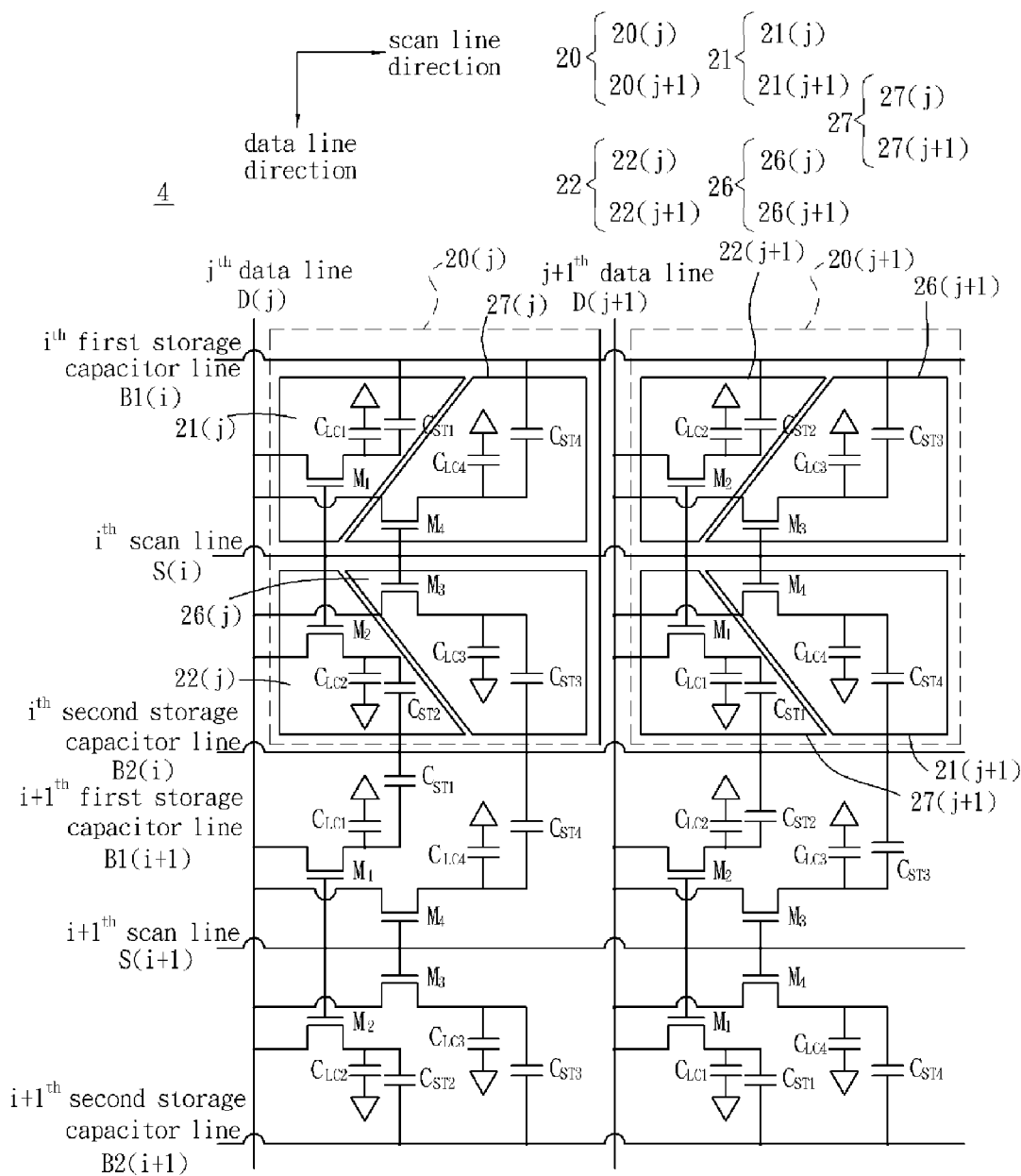
FIG. 18 is a schematic illustration depicting an equivalent circuit of a pixel in an LCD device according to a third embodiment of the invention.

FIG. 18 depicts LCD device 4. In this embodiment, each pixel 20 includes a first sub-pixel 21, a second sub-pixel 22, a third sub-pixel 26, and a fourth sub-pixel 27. For example, the pixel 20(j) includes a first sub-pixel 21(j), a second sub-pixel 22(j), a third sub-pixel 26(j) and a fourth sub-pixel 27(j), the pixel 20(j+1) includes a first sub-pixel 21(j+1), a second sub-pixel 22(j+1), a third sub-pixel 26(j+1) and a fourth sub-pixel 27(j+1), and so on. The first sub-pixels 21(j) and 21(j+1) and the second sub-pixels 22(j) and 22(j+1) are in charge of displaying the darker signal, and the third sub-pixels 26(j) and 26(j+1) and the fourth sub-pixels 27(j) and 27(j+1) are in charge of displaying the brighter signal. The structures of the first sub-pixels 21(j) and 21(j+1), the second sub-pixels 22(j) and 22(j+1) and the third sub-pixels 26(j) and 26(j+1) have been described hereinabove, so detailed descriptions thereof will be omitted. In this embodiment, each of the fourth sub-pixels 27(j) and 27(j+1) includes a liquid crystal capacitor $C_{LC4}$, a storage capacitor $C_{ST4}$ and a switch element $M_4$. In this embodiment, the capacitances of the storage capacitor and the liquid crystal capacitor in each sub-pixel may be designed according to the following conditions that: the capacitance ratio of the storage capacitor $C_{ST1}$ to the liquid crystal capacitor $C_{LC1}$ in the first sub-pixel 21(j) or 21(j+1) is smaller than that of the storage capacitor $C_{ST2}$ to the liquid crystal capacitor $C_{LC2}$ in the second sub-pixel 22 (i.e., $C_{ST1}/C_{LC1}<C_{ST2}/C_{LC2}$); the capacitance ratio of the storage capacitor $C_{ST2}$ to the liquid crystal capacitor $C_{LC2}$ in the second sub-pixel 22(j) or 22(j+1) is smaller than that of the storage capacitor $C_{ST3}$ to the liquid crystal capacitor $C_{LC3}$ in the third sub-pixel 26(j) or 26(j+1) (i.e., $C_{ST2}/C_{LC2}<C_{ST3}/C_{LC3}$); and the capacitance ratio of the storage capacitor $C_{ST3}$ to the liquid crystal capacitor $CLC_3$ in the third sub-pixel 26(j) or 26(j+1) is smaller than that of the storage capacitor $C_{ST4}$ to the liquid crystal capacitor $C_{LC4}$ in the fourth sub-pixel 27(j) or 27(j+1) (i.e., $C_{ST3}/C_{LC3}<C_{ST4}/C_{LC4}$). That is, $C_{ST1}/C_{LC1}<C_{ST2}/C_{LC2}<C_{ST3}/C_{LC3}<C_{ST4}/C_{LC4}$. In other words, the storage capacitor $C_{STn}$ and the liquid crystal capacitor $C_{LCn}$ of each sub-pixel are controlled so that the offset voltage generated under the influence of the storage capacitor line signal is $\Delta V_n$, and finally $\Delta V_1<\Delta V_2<\Delta V_3<\Delta V_4$ can be satisfied, wherein the offset voltages generated by the first to fourth sub-pixels are $\Delta V_1$, $\Delta V_2$, $\Delta V_3$ and $\Delta V_4$, respectively.

In addition, the storage capacitor and the liquid crystal capacitor of each sub-pixel in this embodiment may also be designed according to the conditions that: the capacitance ratio of the storage capacitor $C_{ST1}$ to the liquid crystal capacitor $C_{LC1}$ in the first sub-pixel 21(j) or 21(j+1) is equal to that of the storage capacitor $C_{ST3}$ to the liquid crystal capacitor $C_{LC3}$ in the third sub-pixel 26(j) or 26(j+1) (i.e., $C_{ST1}/C_{LC1}=C_{ST3}/C_{LC3}$); the capacitance ratio of the storage capacitor $C_{ST2}$ to the liquid crystal capacitor $CLC_2$ in the second sub-pixel 22(j) or 22(j+1) is equal to that of the storage capacitor $C_{ST4}$ to the liquid crystal capacitor $C_{LC4}$ in the fourth sub-pixel 27(j) or 27(j+1) (i.e., $C_{ST2}/C_{LC2}=C_{ST4}/C_{LC4}$); and the capacitance ratio of the storage capacitor $C_{ST3}$ to the liquid crystal capacitor $CLC_3$ in the third sub-pixel 26(j) or 26(j+1) is smaller than that of the storage capacitor $C_{ST4}$ to the liquid crystal capacitor $CLC_4$ in the fourth sub-pixel 27(j) or 27(j+1) (i.e., $C_{ST3}/C_{LC3}<C_{ST4}/C_{LC4}$). That is, $C_{ST1}/C_{LC1}=C_{ST3}/C_{LC3}<C_{ST2}/C_{LC2}=C_{ST4}/C_{LC4}$, and $\Delta V_1=\Delta V_3<\Delta V_2=\Delta V_4$.

In the neighboring two pixels 20(j) and 20(j+1) disposed along the scan line direction according to this embodiment, the first sub-pixel 21(j), the second sub-pixel 22(j), the third sub-pixel 26(j) and the fourth sub-pixel 27(j) of the pixel 20(j) and the first sub-pixel 21(j+1), the second sub-pixel 22(j+1), the third sub-pixel 26(j+1) and the fourth sub-pixel 27(j+1) of the next pixel 20(j+1) are substantially mirrored and staggered. More specifically, the junction i.e., the $i^{th}$ scan line S(i), between the first sub-pixel 21(j) and the second sub-pixel 22(j) serves as the symmetrical axis, and then the mirrored image of the combination of the first sub-pixel 21(j) and the fourth sub-pixel 27(j) of the pixel 20(j) is obtained at the positions of the second sub-pixel 22(j) and the third sub-pixel 26(j). Then, the mirrored image is moved by one pixel along the scan line direction so that the first sub-pixel 21(j+1) and the fourth sub-pixel 27(j+1) of the next pixel 20(j+1) may be obtained. Thus, the combination of the first sub-pixel 21(j) and the fourth sub-pixel 27(j) and the combination of the first sub-pixel 21(j+1) and the fourth sub-pixel 27(j+1) are substantially mirrored and staggered in this embodiment.

Similarly, the junction i.e., the $i^{th}$ scan line S(i), between the first sub-pixel 21(j) and the second sub-pixel 22(j) serves as the symmetrical axis, and the mirrored image of the combination of the second sub-pixel 22(j) and the third sub-pixel 26(j) of the pixel 20(j) is obtained at the positions of the first sub-pixel 21(j) and the fourth sub-pixel 27(j). Then, the mirrored image is moved by one pixel along the scan line direction so that the combination of the second sub-pixel 22(j+1) and the third sub-pixel 26(j+1) of the next pixel 20(j+1) may be obtained. Thus, the combination of the second sub-pixel 22(j) and the third sub-pixel 26(j) and the combination of the second sub-pixel 22(j+1) and the third sub-pixel 26(j+1) are substantially mirrored and staggered in this embodiment.

Figure 19:
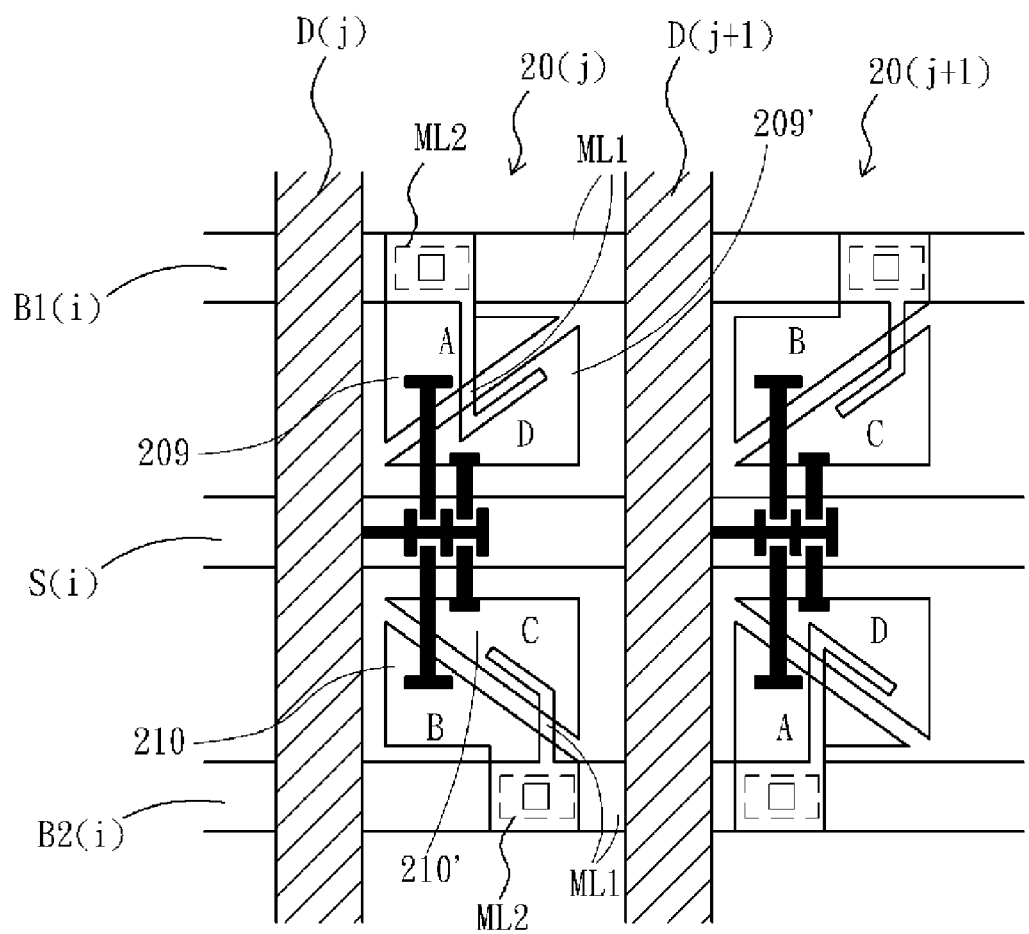
FIG. 19 is a schematic illustration depicting the circuit layout of the LCD device of FIG. 18.

FIG. 19 depicts the circuit layout of the neighboring two pixels 20(j) and 20(j+1), wherein the areas A, B, C and D respectively represent the display areas of the first sub-pixels 21(j) and 21(j+1), the second sub-pixels 22(j) and 22(j+1), the third sub-pixels 26(j) and 26(j+1), and the fourth sub-pixels 27(j) and 27(j+1). As depicted in FIGS. 11B and 19, the area A in FIG. 19 is the transparent electrode 209 in FIG. 11B, the area B in FIG. 19 is the transparent electrode 210 in FIG. 11B, the areas C and D of FIG. 19 are respectively a transparent electrode 210' and a transparent electrode 209' (not shown in FIG. 11B), the storage capacitor lines B1(i) and B2(i) in FIG. 19 are the first metal layers ML1 in FIG. 11B, and the second metal layers ML2 of FIG. 11B are located at the overlapped portions of the storage capacitor lines B1(i) and B2(i) and the areas A and B. As depicted in FIG. 19, the first sub-pixels 21(j) and 21(j+1), the second sub-pixels 22(j) and 22(j+1), the third sub-pixels 26(j) and 26(j+1) and the fourth sub-pixels 27(j) and 27(j+1) in the neighboring two pixels 20(j) and 20(j+1) are substantially mirrored and staggered.

Figure 1:
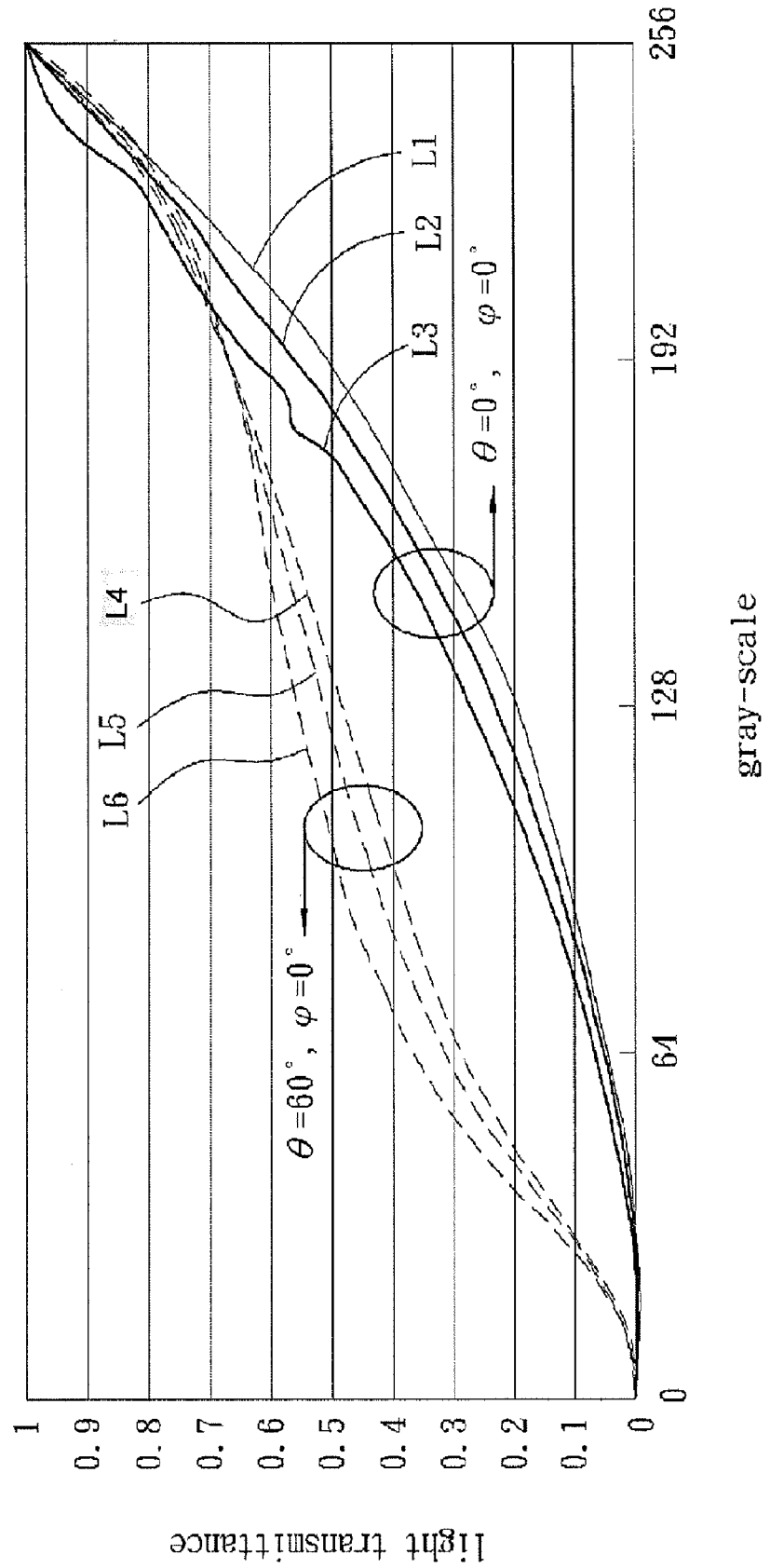
FIG. 1 depicts characteristic curves of gray-scale values versus light transmittances in a multi-domain vertical alignment mode LCD panel according to the prior art.
Figure 2:
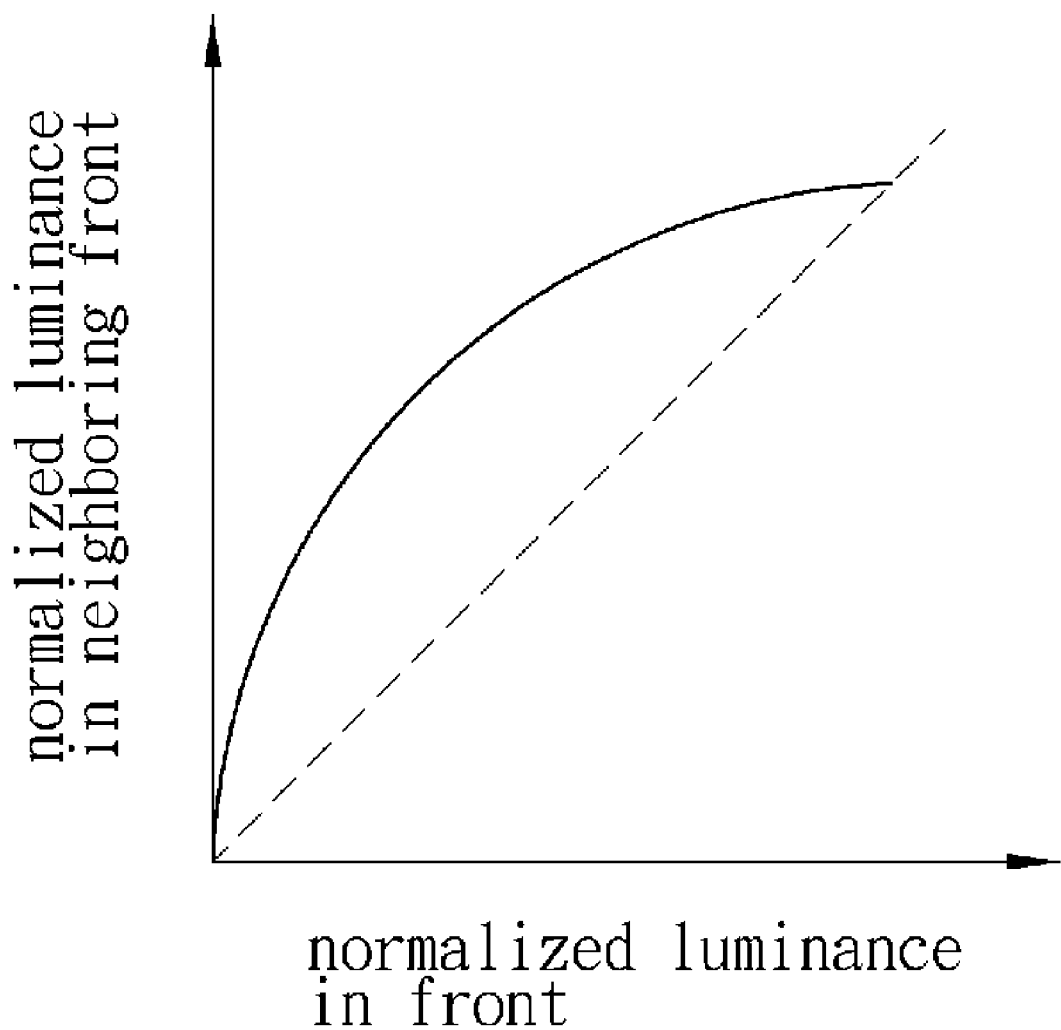
FIG. 2 is a graph depicting the relationship between normalized luminances in the conventional LCD device.
Figure 3:
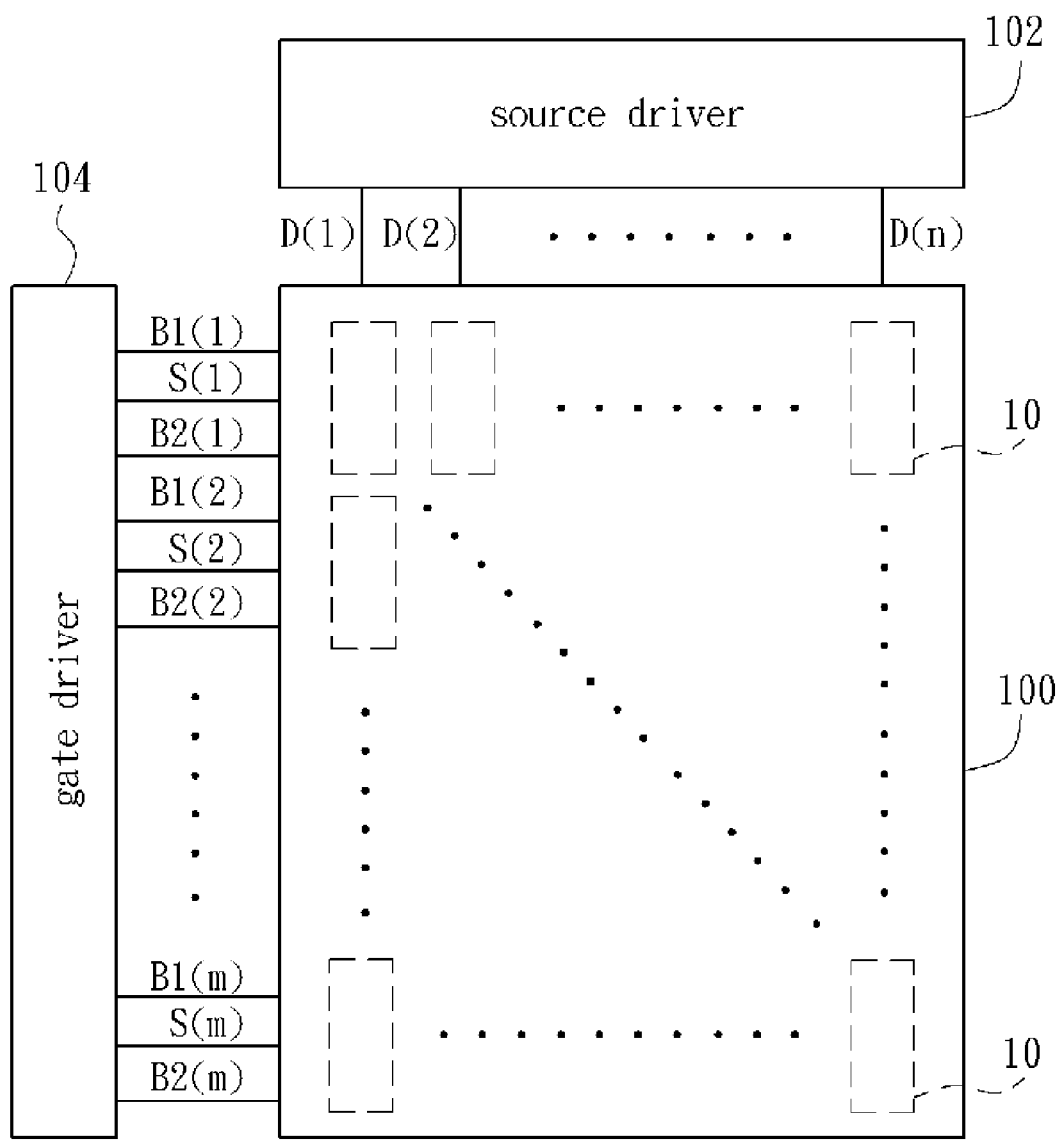
FIG. 3 depicts a conventional multi-domain LCD device.
Figure 4:
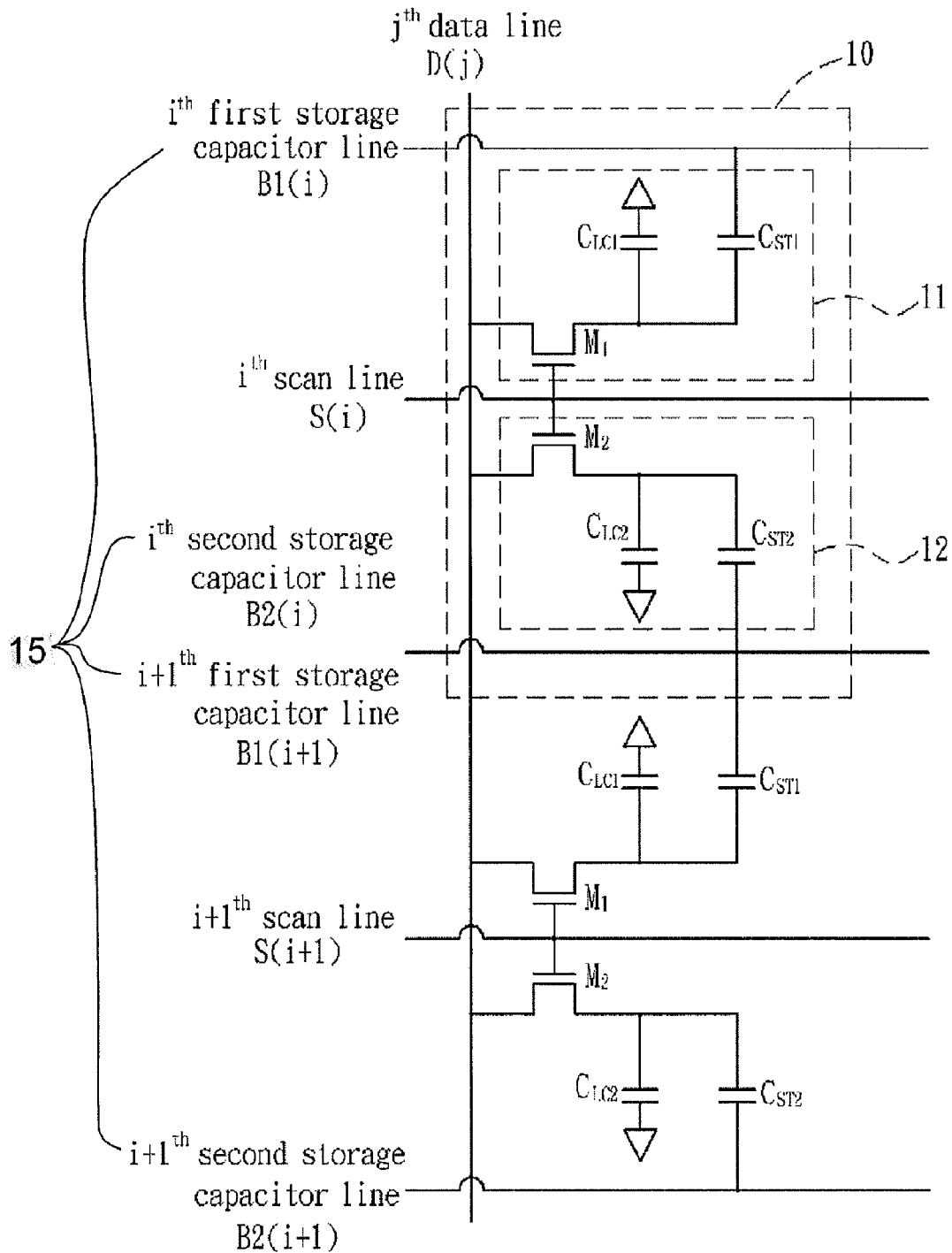
FIG. 4 depicts an equivalent circuit of a pixel in the another conventional LCD device.
Figure 5:
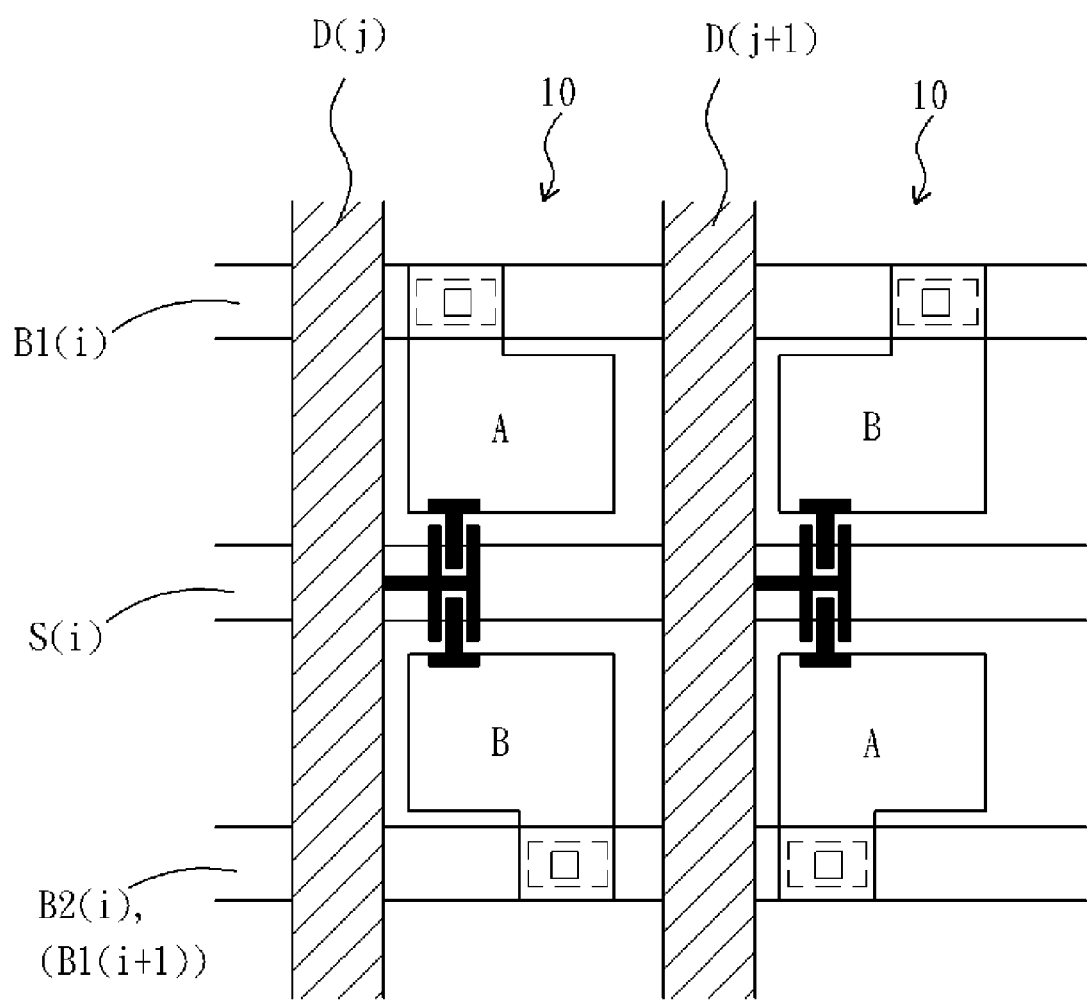
FIG. 5 depicts a circuit layout in the LCD device of FIG. 4.
Figure 6:
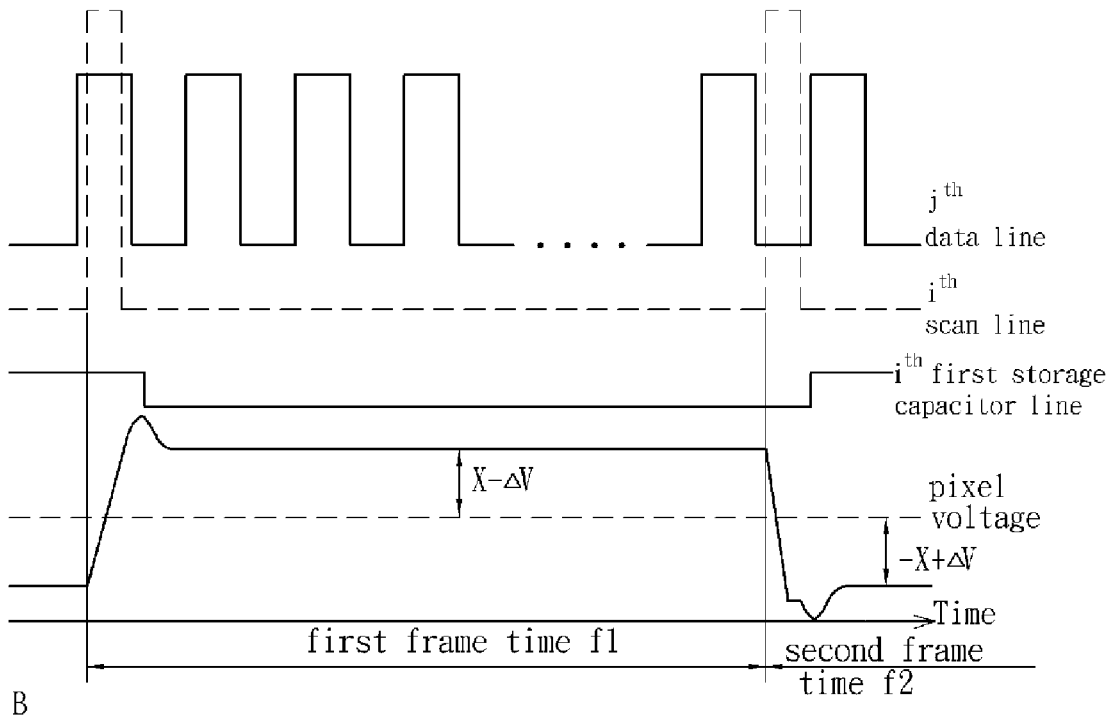
FIG. 6 depicts timings for enabling operations in areas A and B of FIG. 5.
Figure 6:
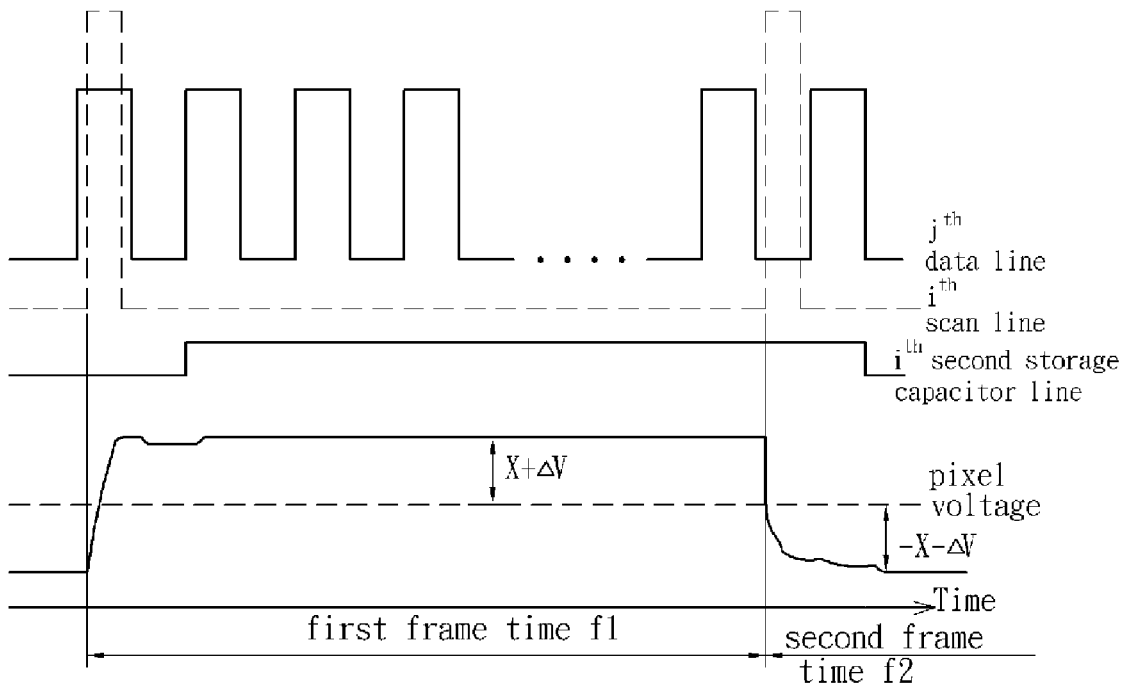
Figure 20:
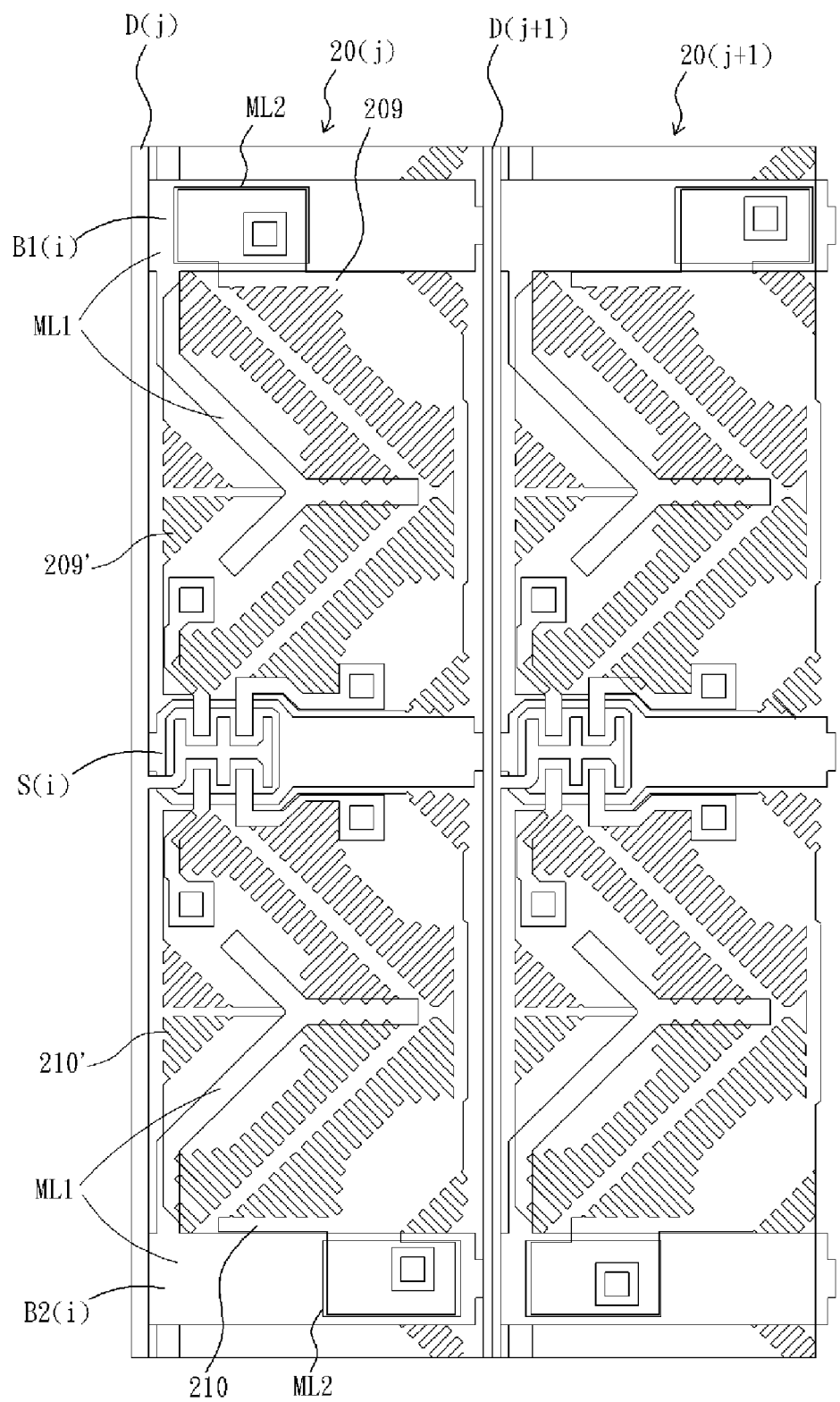
FIG. 20 is a schematic illustration depicting a physical circuit layout of the LCD device of FIG. 18.
Figure 21:
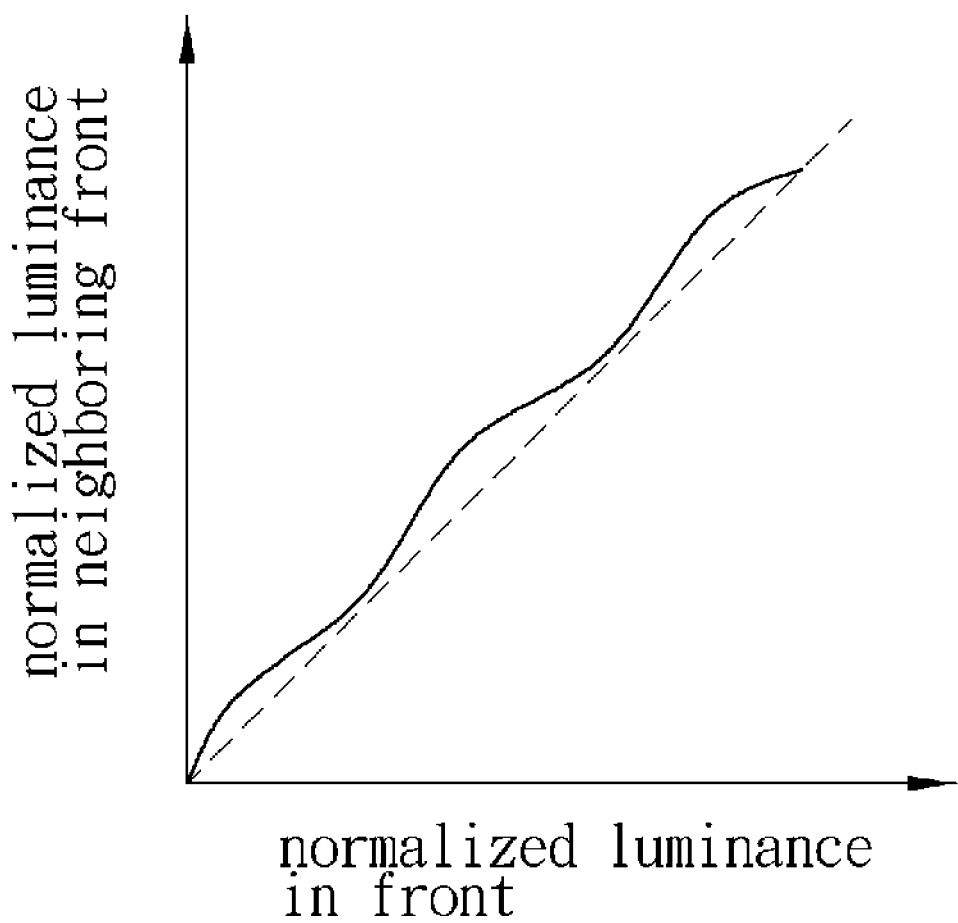
FIG. 21 is a graph depicting the relationship between normalized luminances in the LCD device of FIG. 18.

In addition, FIG. 20 is a schematic illustration depicting the physical circuit layout of the LCD device of FIG. 18, wherein the first storage capacitor lines B1(i) and B1(i+1) and the second storage capacitor line B2(i) have the circuit layout of FIG. 11B. Referring again to FIG. 19, this embodiment divides one pixel into four sub-pixels, so the images viewed by the user in front of and in neighboring front of the screen have the normalized luminances, which approach the ideal condition (the straight line with the slope of 1) as compared with the prior art condition (see FIG. 5). In addition, this embodiment may also improve the γ property of the LCD device 4 by controlling the luminances of four sub-pixels. For example, it is possible to control the luminance of the area C to be higher than that of the area B, the luminance of the area B to be higher than that of the area D, and the luminance of the area D to be higher than that of the area A. Thus, it is found that the combination of the areas B and C is the bright zone, and the areas A and D is the dark zone after the combination of the areas A and D is compared with the combination of the areas B and C. In addition, the areas A, B, C and D have different luminances, and the luminance differences between the areas A, B, C and D may be determined according to the capacitance ratio ($C_{ST1}/C_{LC1}$) of the storage capacitor $C_{ST1}$ to the liquid crystal capacitor $C_{LC1}$ in the first sub-pixel 21, the capacitance ratio ($C_{ST2}/C_{LC2}$) of the storage capacitor $C_{ST2}$ to the liquid crystal capacitor $C_{LC2}$ in the second sub-pixel 22, the capacitance ratio ($C_{ST3}/C_{LC3}$) of the storage capacitor $C_{ST3}$ to the liquid crystal capacitor $C_{LC3}$ in the third sub-pixel 26, and the capacitance ratio ($C_{ST4}/C_{LC4}$) of the storage capacitor $C_{ST4}$ to the liquid crystal capacitor $C_{LC4}$ in the fourth sub-pixel 27. So, the relationship between the normalized luminances viewed in front of and in neighboring front of the screen can be changed more flexibly so that the γ property of the LCD device 4 can be adjusted.

In addition, the embodiments disclosed herein include a driving method applied to the liquid crystal panel. The method includes the following steps. First, the scan line is enabled to turn on the first switch and the second switch. Next, the signal on the data line is transferred to the first sub-pixel and the second sub-pixel. Finally, the scan line is disabled. After the scan line is disabled, the levels of the first storage capacitor line and the second storage capacitor line respectively change so that a first offset voltage (e.g., $\Delta V_1$) is generated between the pixel voltage of the first sub-pixel and an input voltage, and a second offset voltage (e.g., $\Delta V_2$) is generated between the pixel voltage of the second sub-pixel and the input voltage, the pixel voltage of the first sub-pixel is different from the pixel voltage of the second sub-pixel, and the first offset voltage is different from the second offset voltage. Because the driving method of the invention has been described in the above-mentioned embodiments in detail, detailed descriptions thereof will be omitted.

In summary, each pixel includes a first sub-pixel and a second sub-pixel in the LCD device of the invention, and the capacitance ratio of the liquid crystal capacitor to the storage capacitor in the first sub-pixel is smaller than that of the liquid crystal capacitor to the storage capacitor in the second sub-pixel. Therefore, the LCD device and the driving method thereof according to the invention can make the γ value of the LCD device approach an ideal value, effectively improve the γ property of image displaying, and thus enhance the ability to compensate for color differences. Thus, improved compensation due to the phenomenon of color shift, and a better image display quality can be obtained.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display (LCD) device, comprising: a plurality of pixels arranged in a matrix, wherein each of the pixels includes a first sub-pixel and a second sub-pixel, each of the first sub-pixels and the second sub-pixels comprises a liquid crystal capacitor and a storage capacitor, and a capacitance ratio of the storage capacitor to the liquid crystal capacitor in each of the first sub-pixels is smaller than a capacitance ratio of the storage capacitor to the liquid crystal capacitor in each of the second sub-pixels, wherein in a first pixel and a second pixel among the plurality of pixels, the first sub-pixel of the first pixel and the first sub-pixel of the second pixel are staggered, and the second sub-pixel of the first pixel and the second sub-pixel of the second pixel are staggered.

2. The LCD device according to claim 1, wherein the first pixel is disposed adjacent to the second pixel along a scan line direction.

3. The LCD device according to claim 1, wherein the first sub-pixel of the first pixel and the first sub-pixel of the second pixel are substantially mirrored and staggered, and the second sub-pixel of the first pixel and the second sub-pixel of the second pixel are substantially mirrored and staggered.

4. The LCD device according to claim 3, wherein the first sub-pixel of the first pixel and the first sub-pixel of the second pixel are staggered about a center of a junction between the first pixel and the second pixel as a symmetrical axis, and the second sub-pixel of the first pixel and the second sub-pixel of the second pixel are staggered about the center of the junction between the first pixel and the second pixel as the symmetrical axis.

5. The LCD device according to claim 1, wherein: each of the pixels further comprises a third sub-pixel, which includes a liquid crystal capacitor and a storage capacitor; the capacitance ratio of the storage capacitor to the liquid crystal capacitor in the second sub-pixel is smaller than a capacitance ratio of the storage capacitor to the liquid crystal capacitor in the third sub-pixel; and the third sub-pixel of the first pixel and the third sub-pixel of the second pixel are staggered.

6. The LCD device according to claim 5, wherein the first sub-pixel of the first pixel and the first sub-pixel of the second pixel are mirrored and staggered, the second sub-pixel of the first pixel and the second sub-pixel of the second pixel are substantially mirrored and staggered, and the third sub-pixel of the first pixel and the third sub-pixel of the second pixel are substantially mirrored and staggered.

7. The LCD device according to claim 6, wherein the first sub-pixel of the first pixel and the first sub-pixel of the second pixel are staggered about a center of a junction between the first pixel and the second pixel as a symmetrical axis, and a combination of the second sub-pixel and the third sub-pixel of the first pixel and a combination of the second sub-pixel and the third sub-pixel of the second pixel are staggered about the center of the junction between the first pixel and the second pixel as the symmetrical axis.

8. The LCD device according to claim 1, wherein: each of the liquid crystal capacitors is defined by a common electrode, a liquid crystal layer, and a sub-pixel electrode, wherein the common electrode is disposed opposite to the sub-pixel electrode, and the liquid crystal layer is disposed between the common electrode and the sub-pixel electrode; and each of the storage capacitors is defined by a storage electrode, an insulating layer, and a storage common electrode, wherein the storage electrode is electrically connected to the sub-pixel electrode, the storage common electrode is disposed opposite to the storage electrode, and the insulating layer is disposed between the storage common electrode and the storage electrode.

9. The LCD device according to claim 8, wherein in one of the pixels, the common electrode of the first sub-pixel is electrically connected to the common electrode of the second sub-pixel, and the storage common electrode of the first sub-pixel and the storage common electrode of the second sub-pixel are disposed separately.

10. The LCD device according to claim 9, further comprising: a plurality of storage capacitor lines disposed along a scan line direction, wherein in one of the pixels, the storage common electrode of the first sub-pixel and the storage common electrode of the second sub-pixel are respectively connected to neighboring two of the storage capacitor lines.

11. The LCD device according to claim 10, wherein the storage common electrode of the second sub-pixel in one of the pixels and the storage common electrode of the first sub-pixel in adjacent one of the pixels disposed along a data line direction are connected to one of the storage capacitor lines.

12. The LCD device according to claim 1, further comprising: a plurality of scan lines disposed along a scan line direction; a plurality of data lines disposed along a data line direction; and a plurality of pairs of switch elements correspondingly disposed in the pixels, wherein in one of pixels, one of the pairs of switch elements is respectively disposed in the first sub-pixel and the second sub-pixel, and is simultaneously connected to one of the scan lines and one of the data lines, and switch states of the pair of switch elements are controlled by the corresponding scan line.

13. The LCD device according to claim 12, wherein when the switch states of the pair of switch elements are on, a corresponding data line inputs a data line signal to the liquid crystal capacitors and the storage capacitors of the corresponding first sub-pixel and the correspondingly second sub-pixel.

14. The LCD device according to claim 12, wherein each of the switch elements comprises a thin film transistor.

15. The LCD device according to claim 1, wherein the LCD device is a multi-domain vertically aligned (MVA) LCD device, a twisted-nematic LCD device, an optically compensated bend (OCB) LCD device, an axisymmetric aligned (ASM) LCD device, or an in-plane switching (IPS) LCD device.

16. The LCD device according to claim 1, wherein the LCD device is a dot inversion driving type LCD, a frame inversion driving type LCD, or a many-dots inversion driving type LCD.

17. A liquid crystal panel, comprising: a data line formed along a first direction for providing an input voltage;
   a scan line formed along a second direction perpendicular to the first direction;
   a pixel formed at an intersection of the data line and the scan line, the pixel including: a first sub-pixel comprising a first switch, a first liquid crystal capacitor and a first storage capacitor, wherein the first switch has a first terminal connected to the scan line, a second terminal connected to the data line, and a third terminal connected to a first terminal of the first liquid crystal capacitor and a first terminal of the first storage capacitor, and a second sub-pixel comprising a second switch, a second liquid crystal capacitor and a second storage capacitor, wherein the second switch has a first terminal connected to the scan line, a second terminal connected to the data line, and a third terminal connected to a first terminal of the second liquid crystal capacitor and a first terminal of the second storage capacitor;
   a first storage capacitor line electrically connected to a second terminal of the first storage capacitor; and
   a second storage capacitor line electrically connected to a second terminal of the second storage capacitor, wherein: when the scan line is enabled, the first switch and the second switch turn on such that a signal on the data line is transmitted to the first sub-pixel and the second sub-pixel, and after the scan line is disabled, levels on the first storage capacitor line and the second storage capacitor line are respectively changed such that a first offset voltage is generated between a pixel voltage of the first sub-pixel and the input voltage, a second offset voltage is generated between a pixel voltage of the second sub-pixel and the input voltage, the pixel voltage of the first sub-pixel is different from the pixel voltage of the second sub-pixel, and the first offset voltage is different from the second offset voltage.

18. The liquid crystal panel according to claim 17, further comprising a gate driver, which is formed on a substrate of the liquid crystal panel and generates a bias signal to drive the first storage capacitor line and the second storage capacitor line after the scan line is disabled.

19. The liquid crystal panel according to claim 17, wherein:
   the pixel further comprises a third sub-pixel including a third switch, a third liquid crystal capacitor and a third storage capacitor;
   the third switch has a first terminal connected to the scan line, a second terminal connected to the data line, and a third terminal connected to a first terminal of the third liquid crystal capacitor and a first terminal of the third storage capacitor;
   the second storage capacitor line is electrically connected to a second terminal of the third storage capacitor;
   when the scan line is enabled, the first switch, the second switch and the third switch turn on such that a signal on the data line is transmitted to the first sub-pixel, the second sub-pixel and the third sub-pixel; and
   after the scan line is then disabled, levels on the first storage capacitor line and the second storage capacitor line are respectively changed such that the first offset voltage is generated between the pixel voltage of the first sub-pixel and the input voltage, the second offset voltage is generated between the pixel voltage of the second sub-pixel and the input voltage, and a third offset voltage is generated between the pixel voltage of the third sub-pixel and the input voltage such that the pixel voltage of the first sub-pixel, the pixel voltage of the second sub-pixel and the pixel voltage of the third sub-pixel are different from one another, and the first offset voltage, the second offset voltage and the third offset voltage are different from one another.

20. The liquid crystal panel according to claim 19, wherein:
   the pixel further comprises a fourth sub-pixel comprising a fourth switch, a fourth liquid crystal capacitor and a fourth storage capacitor;
   the fourth switch has a first terminal connected to the scan line, a second terminal connected to the data line, and a third terminal connected to a first terminal of the fourth liquid crystal capacitor and a first terminal of the fourth storage capacitor;

the second storage capacitor line is electrically connected to a second terminal of the fourth storage capacitor;

when the scan line is enabled, the first switch, the second switch, the third switch and the fourth switch turn on such that a signal on the data line is transmitted to the first sub-pixel, the second sub-pixel, the third sub-pixel and the fourth sub-pixel; and after the scan line is disabled, levels on the first storage capacitor line and the second storage capacitor line are respectively changed such that the first offset voltage is generated between the pixel voltage of the first sub-pixel and the input voltage, the second offset voltage is generated between the pixel voltage of the second sub-pixel and the input voltage, the third offset voltage is generated between the pixel voltage of the third sub-pixel and the input voltage, and a fourth offset voltage is generated between the pixel voltage of the fourth sub-pixel and the input voltage such that the pixel voltage of the first sub-pixel, the pixel voltage of the second sub-pixel, the pixel voltage of the third sub-pixel and the pixel voltage of the fourth sub-pixel are different from one another, and the first offset voltage, the second offset voltage, the third offset voltage and the fourth offset voltage are different from one another.

21. The liquid crystal panel according to claim 17, wherein each of the first switch and the second switch comprises a thin film transistor.

22. The liquid crystal panel according to claim 17, wherein the LCD device is a multi-domain vertically aligned (MVA) LCD device, a twisted-nematic LCD device, an optically compensated bend (OCB) LCD device, an axisymmetric aligned (ASM) LCD device or an in-plane switching (IPS) LCD device.

23. The liquid crystal panel according to claim 17, wherein the LCD device is a dot inversion driving type LCD, a frame inversion driving type LCD or a many-dots inversion driving type LCD.

24. A driving method applied to a liquid crystal panel, the liquid crystal panel comprising a data line, a scan line, a pixel, a first storage capacitor line and a second storage capacitor line, wherein the data line is formed along a first direction, the scan line is formed along a second direction perpendicular to the first direction, the pixel is formed at an intersection of the data line and the scan line, the pixel comprises a first sub-pixel and a second sub-pixel, the first sub-pixel comprises a first switch, a first liquid crystal capacitor and a first storage capacitor, the first switch has a first terminal connected to the scan line, a second terminal connected to the data line and a third terminal connected to a first terminal of the first liquid crystal capacitor and a first terminal of the first storage capacitor, the second sub-pixel comprises a second switch, a second liquid crystal capacitor and a second storage capacitor, the second switch has a first terminal connected to the scan line, a second terminal connected to the data line, and a third terminal connected to a first terminal of the second liquid crystal capacitor and a first terminal of the second storage capacitor, the first storage capacitor line is electrically connected to a second terminal of the first storage capacitor, and the second storage capacitor line is electrically connected to a second terminal of the second storage capacitor, the driving method comprising the sequential steps of: enabling the scan line to turn on the first switch and the second switch;

transmitting a signal from the data line to the first sub-pixel and the second sub-pixel;

disabling the scan line; and changing levels on the first storage capacitor line and the second storage capacitor line so that a first offset voltage is generated between a pixel voltage of the first sub-pixel before and after the level change of the first storage capacitor line, a second offset voltage is generated between a pixel voltage of the second sub-pixel before and after the level change of the second storage capacitor line, wherein the pixel voltage of the first sub-pixel is different from the pixel voltage of the second sub-pixel, and the first offset voltage is different from the second offset voltage.

25. The driving method according to claim 24, wherein the liquid crystal panel further comprises a gate driver formed on a substrate of the liquid crystal panel, the method further comprising: generating a bias signal by the gate driver to drive the first storage capacitor line and the second storage capacitor line after the scan line is disabled.

26. The driving method according to claim 24, wherein:

the pixel further comprises a third sub-pixel comprising a third switch, a third liquid crystal capacitor, and a third storage capacitor;

the third switch has a first terminal connected to the scan line, a second terminal connected to the data line, and a third terminal connected to a first terminal of the third liquid crystal capacitor and a first terminal of the third storage capacitor;

the second storage capacitor line is electrically connected to a second terminal of the third storage capacitor;

when the scan line is enabled, the first switch, the second switch and the third switch turn on such that a signal on the data line is transmitted to the first sub-pixel, the second sub-pixel and the third sub-pixel; and after the scan line is then disabled, levels on the first storage capacitor line and the second storage capacitor line are respectively changed such that the first offset voltage is generated between the pixel voltage of the first sub-pixel before and after the level change of the first storage capacitor line, the second offset voltage is generated between the pixel voltage of the second sub-pixel before and after the level change of the second storage capacitor line, and a third offset voltage is generated between the pixel voltage of the third sub-pixel before and after the level change of the second storage capacitor line such that the pixel voltage of the first sub-pixel, the pixel voltage of the second sub-pixel and the pixel voltage of the third sub-pixel are different from one another, and the first offset voltage, the second offset voltage and the third offset voltage are different from one another.

27. The driving method according to claim 26, wherein: the pixel further comprises a fourth sub-pixel comprising a fourth switch, a fourth liquid crystal capacitor and a fourth storage capacitor;

the fourth switch has a first terminal connected to the scan line, a second terminal connected to the data line, and a third terminal connected to a first terminal of the fourth liquid crystal capacitor and a first terminal of the fourth storage capacitor;

the second storage capacitor line is electrically connected to a second terminal of the fourth storage capacitor;

such that the method includes: turning on the first switch, the second switch, the third switch and the fourth switch when the scan line is enabled, such that a signal on the data line is transmitted to the first sub-pixel, the second sub-pixel, the third sub-pixel and the fourth sub-pixel; and changing levels on the first storage capacitor line and the second storage capacitor line, respectively, after the scan line is disabled, such that the first offset voltage is generated between the pixel voltage of the first sub-pixel before and after the level change of the first storage capacitor line, the second offset voltage is generated between the pixel voltage of the second sub-pixel before and after the level change of the second storage capacitor line, the third offset voltage is generated between the pixel voltage of the third sub-pixel before and after the level change of the second storage capacitor line, and a fourth offset voltage is generated between the pixel voltage of the fourth sub-pixel and before and after the level change of the first storage capacitor line such that the pixel voltage of the first sub-pixel, the pixel voltage of the second sub-pixel, the pixel voltage of the third sub-pixel and the pixel voltage of the fourth sub-pixel are different from one another, and the first offset voltage, the second offset voltage, the third offset voltage and the fourth offset voltage are different from one another.

* * * * *